(12) United States Patent
Brunel et al.

(10) Patent No.: US 9,311,057 B2
(45) Date of Patent: Apr. 12, 2016

(54) ACTION LANGUAGES FOR UNIFIED MODELING LANGUAGE MODEL

(75) Inventors: Jean-Yves Brunel, Paris (FR); Nathan E. Brewton, Wayland, MA (US); Ebrahim Mehran Mestchian, Newton, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1165 days.

(21) Appl. No.: 11/891,467

(22) Filed: Aug. 10, 2007

(65) Prior Publication Data

US 2007/0277151 A1 Nov. 29, 2007

Related U.S. Application Data

(63) Continuation of application No. 11/436,475, filed on May 17, 2006.

(51) Int. Cl.
*G06F 9/44* (2006.01)

(52) U.S. Cl.
CPC ... *G06F 8/31* (2013.01); *G06F 8/10* (2013.01)

(58) Field of Classification Search
CPC ........................................................ G06F 8/31
USPC ............ 717/106–109, 104, 124, 113; 703/13, 703/22, 26, 6, 2; 715/763, 239, 501.1; 714/38; 700/1, 108, 86; 705/7; 709/203; 719/313; 707/102
See application file for complete search history.

(56) References Cited

U.S. PATENT DOCUMENTS

| | | | |
|---|---|---|---|
| 5,889,992 A * | 3/1999 | Koerber | 717/108 |
| 5,917,730 A * | 6/1999 | Rittie et al. | 703/6 |
| 6,282,699 B1 | 8/2001 | Zhang et al. | |
| 6,874,146 B1 * | 3/2005 | Iyengar | 719/313 |
| 7,340,684 B2 | 3/2008 | Ramamoorthy et al. | |
| 7,487,493 B1 * | 2/2009 | Faulkner | G06F 8/31 717/105 |
| 2002/0184610 A1 * | 12/2002 | Chong et al. | 717/109 |
| 2002/0188928 A1 * | 12/2002 | Szpak et al. | 717/106 |
| 2004/0205507 A1 * | 10/2004 | Tuschner et al. | 715/501.1 |

(Continued)

FOREIGN PATENT DOCUMENTS

WO          01/73546 A2    10/2001

OTHER PUBLICATIONS

Simulink, Model-Based and System-Based Design, "Using Simulink", Version 5, copyright 2002, ch. 4, 7, 9-11, 13-14, p. 1-134 < UsingSimulink4-14.pdf>.*

(Continued)

*Primary Examiner* — Tuan Vu
(74) *Attorney, Agent, or Firm* — Harrity & Harrity, LLP

(57) ABSTRACT

Methods, mediums and systems are provided to enable a user to program the behaviors of a Unified Modeling Language (UML) model in a graphical programming or modeling environment, such as block diagram programming environment. The UML model is exported into a text-based format, which is subsequently imported into the graphical programming or modeling environment. The graphical programming or modeling environment represents the UML model using functional blocks so that the user can program the behaviors of the UML model. The graphical programming or modeling environment also enables the user to simulate or execute the UML model to determine the behaviors of the UML model.

21 Claims, 12 Drawing Sheets

(56) References Cited

U.S. PATENT DOCUMENTS

| | | | |
|---|---|---|---|
| 2005/0060684 A1* | 3/2005 | Gupta et al. | 717/105 |
| 2005/0071803 A1 | 3/2005 | Cherdron et al. | |
| 2005/0091602 A1* | 4/2005 | Ramamoorthy et al. | 715/763 |
| 2005/0096894 A1* | 5/2005 | Szpak et al. | 703/13 |
| 2005/0234976 A1 | 10/2005 | Oara et al. | |
| 2005/0257194 A1* | 11/2005 | Morrow et al. | 717/109 |
| 2006/0136482 A1* | 6/2006 | Conn et al. | 707/102 |
| 2006/0155387 A1* | 7/2006 | Pieronek | 700/1 |
| 2006/0200482 A1* | 9/2006 | Tan | 707/102 |
| 2007/0198968 A1* | 8/2007 | Shenfield et al. | 717/104 |
| 2007/0277151 A1 | 11/2007 | Brunel et al. | |

OTHER PUBLICATIONS

Moreno Marzolla, "Simulation-Based Performance Modeling of UML Software Architectures", Feb. 2004, TD-2004-1, pp. 1-82.*

Simulink, "Using Simulink", Version 5, copyright 2002, chp. 1-14, 472 pgs <SimulinkV5.pdf>.*

Douglass, Bruce Powel, "Real Time URL, Third Edition, Advances in the UML for Real-time Systems," Addison Wesley (2004).

Marzolla, Moreno, "Simulation-Based Performance Modeling of UML Software Architectures," PH.D. Thesis: TD-2004-1, Universita Ca' Foscari DI Venezia (2004).

Rational Rosea, "Toolset Guide," retrieved online at ftp://ftp.software.ibm.com/software/rational/docs/v2002_r2/unix/pdf/RoseRT/toolsetguide.pdf.

Wikipedia, "Executable UML," retrieved online at http://en.wikipedia.org/wiki/Executable_UML (2006).

International Search Report for Application No. PCT/US2007/011798, dated Jan. 30, 2008.

Hause, Matthew, "The SysML Modelling Language," Fifth European Systems Engineering Conference (2006).

Reichmann, Clemens et al., "Model Level Coupling of Heterogeneous Embedded Systems," Proc. 2nd RTAS Workshop on Model-Driven Embedded Systems (2004).

Vanderperren, Yves et al., "From UML/SysML to Matlab/Simulink: Current State and Future Perspectives," Proc. Design, Automation and Test in Europe (2006).

Xu, Weigao, "The Design and Implementation of the mModelica Compiler," A thesis submitted to the Faculty of Graduate Studies and Research in partial fulfilment of the requirements of the degree of Master of Science in Computer Science, School of Computer Science, McGill University, Montreal, Canada (2005).

European Communication corresponding to EP 07 777 117.8 mailed on Jun. 23, 2014, 7 pages.

* cited by examiner

```
<XMI xmi.version="1.2" timestamp="Mon Feb 13 15:26:30 EST 2006>
 + <XMI.header></XMI.header>
 - <XMI.content>
   - <UML:Model xmi.id="1fd28773m10964b9459cmm7f0c" name="cse" isSpecification="false" isRoot="false" isLeaf="false" isAbstract="false">
     - <UML:Namespace.ownedElement>
       + <UML:Sterotype xmi.id="1fd28773m10964b9459cmm7f4a" name="realize" isSpecification="false" isRoot="false" isLeaf="false" isAbstract="false"></UML:Sterotype>
       + <UML:Sterotype xmi.id="1fd28773m10964b9459cmm7f48" name="use" isSpecification=False" isRoot="false" isLeaf="false" isAbstract="false"></UML:Sterotype>
       + <UML:TagDefinition xmi.id="1fd28773m10964b9459cmm7f42" name="documentation" isSpecification="false"></UML:TagDefinition>
       + <UML:Package xmi.id="1fd28773m10964b9459cmm7f42" name="java" visibility="public" isSpecification="false" isRoot="false" isLeaf="false" isAbstract="false"></UML:
       - <UML:Package xmi.id="1fd28773m10964b9459cmm7f10" name="protectedAddSub" isSpecification="false" isRoot="false" isLeaf="false">
         - <UML:Namespace.ownedElement>
           + <UML:Class xmi.id="1fd28773m10964b9459cmm7f36" name="Client" visibility="public" isSpecification="false" isRoot="false" isLeaf="false" isAbstract="false" isActive="false"></UML:Class>
           + <UML:Class xmi.id="1fd28773m10964b9459cmm7f32" name="Server" visibility="public" isSpecification="false" isRoot="false" isLeaf="false" isAbstract="false" isActive="false"></UML:Class>
           + <UML:Interface xmi.id="1fd28773m10964b9459cmm7f16" name="addSubIF" visibility="public" isSpecification="false" isRoot="false" isLeaf="false" isAbstract="false"></UML:Interface>
           + <UML:Abstraction xmi.id="1fd28773m10964b9459cmm7f14" isSpecification="false"></UML:Abstraction>
           + <UML:Dependency xmi.id="1fd28773m10964b9459cmm7f12" isSpecification="false"></UML:Dependency>
           + <UML:Interface xmi.id="1fd28773m10964b9459cmm7e4e" name="errHandlerIF" visibility="public" isSpecification="false" isRoot="false" isLeaf="false" isAbstract="false"></UML:Interface>
           + <UML:Dependency xmi.id="1fd28773m10964b9459cmm7e49" isSpecification="false"></UML:Dependency>
           + <UML:Class xmi.id="1fd28773m10964b9459cmm7e40" name="ErrHandler" visibility="public" isSpecification="false" isRoot="false" isLeaf="false" isAbstract="false" isActive="false"></UML:Class>
           + <UML:Abstraction xmi.id="1fd28773m10964b9459cmm7e2b" isSpecification="false"></UML:Abstraction>
           + <UML:Collaboration xmi.id="1fd28773m10964b9459cmm7e1f" name="Collaboration_spec" visibility="public" isSpecification="false" isRoot="false" isLeaf="false" isAbstract="false"></UML:Collaboration>
         </UML:Namespace.ownedElement>
       </UML:Package>
       + <UML:Sterotype xmi.id="1fd28773m10964b9459cmm7d9b" name="create" isSpecification="false" isRoot="false" isLeaf="false" isAbstract="false"></UML:Sterotype>
     </UML:Namespace.ownedElement>
   </UML:Model>
   + <UML:Diagram xmi.id="1fd28773m10964b9459cmm7e50" isVisible="true" name="AddSub Class Diagram" zoom="1.0"></UML:Diagram>
   + <UML:Diagram xmi.id="1fd28773m10964b9459cmm7e1d" isVisible="true" name="simpleSequenceSpec" zoom="1.0"></UML:Diagram>
 </XMI.content>
</XMI>
```

Fig. 7

ACTION LANGUAGES FOR UNIFIED MODELING LANGUAGE MODEL

RELATED APPLICATION

This application is a Continuation of application Ser. No. 11/436,475 filed on May 17, 2006.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to graphical programming or modeling environments for modeling programs and more particularly to methods, mediums and systems for providing a graphical action language for a model in Unified Modeling Language (UML) or its dialects or extensions.

BACKGROUND OF THE INVENTION

The Unified Modeling Language (UML) is a modeling and specification language used in software engineering. UML is often used for modeling object-oriented programs. UML includes a standardized modeling notation that may be used to create an abstract representation ("UML model") of a system. While UML was designed to specify, visualize, construct, and document software-intensive systems, UML is not restricted to modeling software and can be used for modeling systems in general. For example, UML can also be used for business process modeling, engineered system modeling, and modeling of organizational structure.

SUMMARY OF THE INVENTION

The present invention relates generally to graphical programming or modeling environments and more particularly to methods, mediums and systems for providing an action language for modeling a system designed or described in a modeling language. For example, the graphical or modeling environment may be used to model the behavior of software, physical and/or control systems described in a software modeling language such as UML, or a specialized dialect of UML with optional extensions, such as, for example, the SysML variant of UML with system-engineering extensions, and the Advanced Architecture Description Language (AADL). The action language may support modeling real-time operations of systems that are at least partially defined in a software modeling language.

UML models are typically designed to capture the structure of a software system. UML does not define a formal and precise-enough semantic to allow a user to automatically build an executable model. Though the behavior of the system can be modeled by statecharts, which is an imperative and untimed language based on state transition diagrams, it is difficult to use statecharts to capture all behavioral aspects of a system. Therefore, users may need to be skilled in a textual programming language, such as C++ and Java, to add textual code for the UML model in order to program methods that implement the operations that are defined by the model. Unfortunately, UML model designers are generally software architects who construct the UML model at an abstract level and are not always skilled in programming languages and coding.

The imperative programming paradigm of text-based languages such as C++ and Java and graphical languages such as statecharts require detailing how a sequence of operations implements a computation. These languages are well-suited for specifying the finer details of sequences of computations, but are poorly suited for implementing extensive applications such as business software applications. Developing applications with imperative programming languages is tedious and error prone. These limitations of imperative programming languages are reflected in the development time and expense and defects found in present day software. The problems are compounded for real-time computation-intensive systems.

The need for using text-based imperative programming languages to write methods for UML models makes it difficult to employ UML for the design of mission critical functions in real-world applications, such as medical, aerospace or automobile applications. Programming such functions requires solving time-ordering and data-precision complexities that are beyond the typical skill set of programmers using imperative languages irrespective of their qualifications in numerical computation sciences. It is often preferable to design these systems in dynamically typed and declarative languages such as time-based block diagrams, which include further domain specific facilities, such as the notion of sample time and data type propagation. Therefore, there is a need to support declarative languages by software modeling languages like UML, especially when these languages are employed for the design of embedded control systems.

In accordance with a first aspect of the invention, the present invention provides a graphical programming or modeling environment for software modeling languages, such as UML and variants. The environment supports at least one of a declarative action language and a dynamically typed action language. The action language may be graphical and/or textual and may enable a user to design and execute a program or model.

The action language may be used for programming behaviors of a model designed using UML or its variants. As used herein, the term UML is understood to include UML and any of its dialects and/or extensions, such as SysML. It will be understood by one of skill in the art that alternative embodiments of the invention may involve models designed in modeling languages other than UML. The behaviors of a UML model may address real-time and computation-intensive needs. The computations may proceed in a distributed manner on multiple core processors, multiple processor platforms, and/or clusters of computers employing distributed computing facilities, such as, for example, the Distributed Computing Toolbox of The MathWorks, Inc. of Natick, Mass.

The terms "graphical environment" and "graphical action language" are interchangeably used to refer to an environment that enables a user to design and execute a graphical program or model.

The programming or modeling environment of the present invention may enable a user to program behaviors of the UML model in an integrated and executable manner, such that there is a relationship between the UML model and the action language model and any changes to one may be reflected in the other. Graphical models that capture the model behavior may be state transition diagrams, data flow diagrams, entity flow diagrams, Petri nets, sequential function charts, time-based block diagrams, rigid-body diagrams, electrical circuit diagrams, bond graphs, network diagrams, etc. These diagrams may represent numerical behavior, which may be computed in real-time. In an alternative embodiment of the invention, the programming or modeling environment may restrict the use of a modeling formalism to only allow diagrams that comply with a predefined style. For example, in one embodiment of the invention, only Moore or Mealy type state machines may be allowed, while in another embodiment of the invention, only time-based block diagram models that produce MISRA compatible code may be allowed. Any other style guideline may be enforced by the programming or modeling environment during different stages of the design of a model such as editing, parsing, compiling, simulating, and code generating.

The graphical model may include extensive textual aspects that can be declarative as well as imperative in nature. In addition, the graphical model may include dynamically typed and statically typed aspects. The graphical action language of the present invention enables a user to graphically program the methods or behaviors of a UML model or components in the UML model so that the UML model can be easily converted to executable code.

In an alternative embodiment of the invention, the UML model with an action language can be simulated in an interpreted fashion. No code needs to be generated. Instead, the behaviors of the model are computed directly from the model or based on an intermediate representation of the UML model with the action language.

In one embodiment of the present invention, the action language for the UML model may be a block diagram modeling language. The environment for block diagram modeling may provide a set of block libraries for programming the methods and behaviors of the UML model or components in the UML model. The graphical action language may be hierarchical and include nesting and referencing language elements. In one aspect of the invention, the reference may be a reference to an element in a library, a separate model, a part of a separate model, and a component that may be a shared library with a well-defined interface or accessible through a message passing protocol.

The programming or modeling environment may contain or have access to block libraries. The block libraries may contain blocks such as one and higher dimensional lookup tables. These lookup table blocks may contain one or multiple input values. A table is specified by a set of data points on a grid that has as many dimensions as the number of input values. The data points at each grid point may be scalar or multi-dimensional as well. For each set of input values, the output is determined by the grid points. In case the input values correspond exactly to a grid point, the data at that grid point can be returned as output. If, however, the input values are in between grid points, an interpolation scheme can be employed to derive the data point for those input values. This may be a linear interpolation, a zero-order hold interpolation, a curve fitting interpolation or any other interpolation scheme. Similarly, if the input values are beyond the grid of the table, an extrapolation scheme can be employed for which similar techniques as for interpolation exist, while different approaches for interpolation and extrapolation may be employed. In case multiple lookup tables with the same input grid are used, the computation of the index and fraction on the grid can be precomputed by a pre-indexing block and directly used as input to the lookup table block. Precomputing prevents repeated computation of the same result.

A block library may further contain a continuous-time integrator block to integrate the set of input values over time. More generally, a transfer function block can be included in the block library. The coefficients of this transfer function may be specified in a number of different forms such as by coefficients in a numerator and denominator, by an observer canonical form, and by a controller canonical form. Sparse representations may be employed where coefficients that are 0 are not explicitly represented unless expressly necessary (for example for tuning purposes or because of the specific canonical form).

Other blocks that may be available from the block library include a truth table block, a state transition diagram block, a zero-crossing detection block, a discrete-time integrator and transfer function, a logic operations block, an arithmetic operations block which facilitates addition, subtraction, multiplication, and division, and a trigonometric operation block. Additionally, data store blocks may be available, to allow shared variables through data read and data write blocks without the need for explicitly drawn connections.

The block diagram modeling language may support the modeling effort by automatically assigning characteristics of variables. These characteristics may include but not be limited to data type, whether complex values (with a real and imaginary part) are used, the dimension of a signal, and the sample rate of a signal. Propagation may be implemented based on a type lattice and a fixed-point iteration over the partial order as provided by the lattice. Degrees of freedom can be resolved in a conservative or optimistic manner. For example, if a signal has to at least have the integer data type, it can be selected to be an integer, but, alternatively, the data type double may be assigned as well. Different algorithms for propagating characteristics of model variables such as signals exist, for example forward propagation, backward propagation, and a combination of the two, supplemented by heuristics that may be used to resolve conflicts and ambiguities.

In another aspect of the invention, the action language is used for coverage analysis to identify which elements of a model have been evaluated during a set of executions. In yet another aspect, the action language is used to analyze the time it takes for model elements to be evaluated. This timing analysis can be used to schedule the execution of model elements so as to achieve real-time behavior on a given computing platform. In a further aspect, the action language is used to automatically generate tests that contain input values to the model. The generated tests are generated so as to invoke certain behavior of the model or so as to enforce evaluation of certain model elements.

In accordance with another aspect of the invention, a medium is provided for use with a computing device holding instructions executable by the computing device for performing a method. The method comprises providing a graphical programming or modeling environment for software modeling languages such as UML and variants, the environment supporting at least one of a declarative action language and a dynamically typed action language. Said action language may be graphical and textual and enable a user to design and execute a program or model.

In accordance with another aspect of the invention, a system is provided for generating and displaying a graphical modeling application. A system for generating and displaying a graphical modeling application, said system includes a UML model generated in a graphical programming or modeling environment; and means for modeling behavior of an aspect of said UML model by using at least one of a declarative action language and a dynamically typed action language. Said action language may be graphical and textual and enable a user to design and execute a program or model.

BRIEF DESCRIPTION OF THE DRAWINGS

The aforementioned features and advantages, and other features and aspects of the present invention, will become better understood with regard to the following description and accompanying drawings, wherein:

FIG. 7 is an exemplary XMI file into which the UML model is exported;

DETAILED DESCRIPTION

Figure 1:
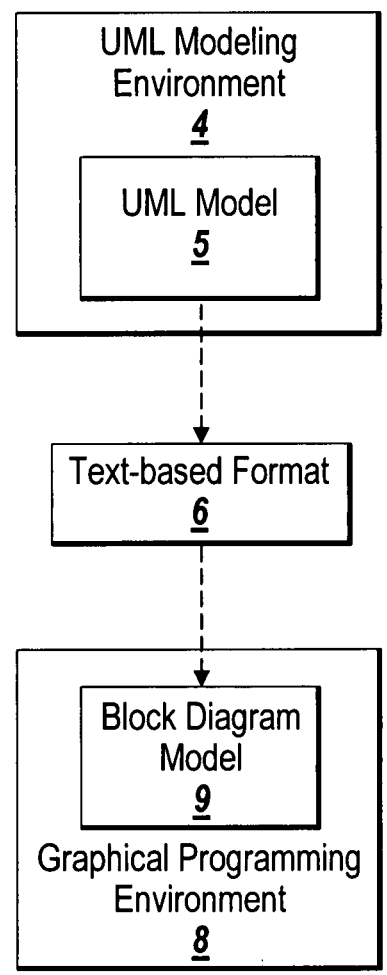
FIG. 1 depicts an illustrative embodiment of the present invention in which a model generated in a UML modeling environment is imported into a graphical programming or modeling environment.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

One embodiment of the present invention provides an action language for modeling the temporal behavior of a unified modeling language (UML) model. Declarative and dynamically typed action languages may be provided for modeling the behavior of physical, control, real-time and computation-intensive systems of a UML model. The behavioral model corresponds to a computational representation that is evaluated by the supplied environment or an external product. One embodiment of the present invention additionally provides a graphical environment for creating and executing, either in an interpreted, compiled, or mixed fashion, UML diagrams that instantiate the realized objects. Each execution generates a UML interaction diagram with time-annotated messages between the participating objects as a means for software, control, and system designers to collaboratively refine and document the interfaces.

In accordance with another aspect of the invention, debugging and profiling of the execution of a UML model that has a realization in the action language can be performed. While debugging, the execution of a model can be halted at desired points in the sequence of computations. A breakpoint indicates a point at which the computations are to be halted. When halted, values of model elements and variables can be inspected. Halting execution of the model can be done programmatically based on conditional breakpoints. The debugging facilities of graphical models may allow breakpoints to be set on model elements so as to halt execution immediately before they are evaluated. Breakpoints can also be set in, for example, the numerical solver computations. For example, in the case where a computed integration step is rejected because it leads to too large an error in the numerical approximation, execution can be halted and internal solver variable values as well as model entity and variable values can be inspected. Profiling involves reporting on the computational cycles spent on evaluating model elements. The reports generated by profiling can be hierarchically structured and can provide, for example, insight as to where execution of a model may be optimized.

In a real-time configuration, the time spent evaluating model entities can be profiled. Real-time execution typically depends on implementation factors that may include the ambient temperature and nondeterministic effects of the microprocessor task execution. As such, the real-time execution may vary, and the real time that is required to evaluate model entities may vary. One aspect of system design that can be determined by profiling is the worst-case execution time for model entities. This worst-case execution time can then be used to construct a conservative schedule for model execution such that in the worst case, the model execution still remains below an upper bound in time. This schedule can be automatically generated from the model and information on the execution platform. For example, tasks that can be parallelized based on the model may result in a worst-case execution time of only one of the possible paths of execution for the task. Likewise, the schedule can be established by a designer or a semi-automated approach may be employed. Other design, analysis, and synthesis tasks are facilitated by knowledge of task execution times, including worst-case execution time, as understood by the skilled practitioner in the art.

In one embodiment of the present invention, a UML model may be exported into a text-based format, such as an XML Metadata Interface (XMI) format. The modeling environment may read the XMI format and publish the components of the UML model using hierarchical computational blocks provided in the modeling environment.

The graphical programming or modeling environment enables a user to edit a UML model. Editing the UML model may include adding new modeling elements such as interaction models that show an exchange of messages between run-time objects. In another embodiment of the invention, editing the UML model may involve adding tag-value pairs to one or more UML modeling elements to hold extra information such as information resulting from the graphical modeling and execution activities. In yet another embodiment of the invention, editing the UML model may involve modifying existing model elements, such as existing tagged values, and datatypes of operations.

The graphical programming or modeling environment enables graphical modeling of the behavior of the UML model so that the model can be executed in the graphical programming or modeling environment. Execution may be realized by running of code that results from code generation or by interpreting the model. Different versions of code can be automatically generated from the graphical action language and deployment artifacts of the corresponding elements of the UML model. A deployment artifact is a combination of requirements and instructions for compiling and/or executing the UML model. These different versions may vary between highly instrumented code for debugging, profiling, and prototyping purposes, which may include functionality for data logging and the like, to highly optimized, optionally fixed-point, code to be used in the production version of a system under design. Optimizations that may be employed are the inlining and outlining of functionality, constant propagation, expression folding, unrolling of iteration loops, merging of iteration loops, limiting the scope of local variables by reordering assignments, and the like.

In one embodiment, the graphical programming or modeling environment provides search facilities for the UML model and the model designed using the action language. These search facilities include but are not limited to facilities for searching specific properties of model elements, facilities for searching for strings, facilities for searching for types, facilities for searching for certain parameter values and settings, and facilities for performing customizable searches using a query language such as the Object Constraint Language (OCL) and XQuery.

In another embodiment of the invention, the generated code and the related model entities are hyperlinked. This allows the user to directly navigate between the corresponding parts of the code and model. One embodiment includes hyperlinks in the generated code that, when clicked, bring up the corresponding model part. The model parts may have a right-click popup menu with an option to bring up the generated code that relates to that model part. The relation may be one-to-one (for example, when one addition is executed in code in correspondence to a summation block in the graphical model), many-to-one (for example, when expression folding results in one assignment in the code capturing the computation of a number of blocks in the graphical model and, conversely, when a block in the graphical model requires more than one statement in code), and many-to-many (for example, when the folding of expressions generated by more than one block includes more than one expression that corresponds to one block).

In a further embodiment of the invention, generating production code may additionally generate the construction artifacts of concrete components that have been realized within the graphical programming or modeling environment. These artifacts notably include the generated code (for example, source, include, binary, executable, scripts, and command files) as well as all additional deployment data (for example, a makefile, documentation and report files, and component-description files for a specific component-platform such as CORBA, its real-time extension CORBA-RT, AADL, Autosar, and Software Communication Architecture (SCA) as defined by the Department of Defense, and derivates). The corresponding UML notations for the realized concrete components are additionally generated and added to the initial UML model using the appropriate UML modeling element (for example, description, annotation, and tag-values).

In another embodiment of the present invention, the graphical programming or modeling environment may simulate a UML component diagram that extends to continuous and discrete time aspects of multi-domain systems for physical, chemical, biological, and business applications. The alternative embodiment of the present invention may also generate, optimize and validate the implementation code of a UML component that incorporates the numerical and temporal behavior of the model. The code may be deployed on embedded hardware, rapid prototyping hardware, target hardware as well as wetware. The code may describe an implementation in software, for example as a C or C++ program, but it may also describe an implementation in hardware by means of a hardware description language (HDL).

In an additional embodiment of the present invention, the graphical programming or modeling environment may simulate a UML deployment diagram that enables a user to assess performance, load, reliability, and schedulability requirements of the run-time processing nodes against the time and numerical resolution of control and signal-processing algorithms with safety and reliability constraints. The simulation may include a discrete event model of the implementation part. The parameters of this implementation model may be generated by reading an architecture description from a UML profile such as AADL describing objects such as CPUs, physical buses, memory layout, and device driver performance.

In another embodiment of the present invention, the graphical programming or modeling environment may generate a sequence diagram automatically from the interpreted, compiled, or mixed execution of the model. The sequence diagram is one of the UML interaction models. The generated sequence diagram may be converted into a text-based format, such as the XML format, and merged into the text-based XMI format of the UML component model so that the UML source model contains the component diagram and the sequence diagram.

In one aspect of the invention, a sequence diagram that is part of the UML model is automatically converted into a set of input signals to the behavioral model. The sequence diagram as it is part of the UML model may associate behavioral input to a temporal sequence of message exchange. This sequence can be directly used as input during execution (either interpreted, compiled, or mixed) of the behavior model, while the dependent activities in the sequence diagram emerge during the execution and can be validated against the original sequence diagram.

Another embodiment of the present invention provides a declarative graphical action language for modeling the behaviors of a unified modeling language (UML) model. The behavioral model corresponds to a computational representation that is evaluated by the supplied environment or an external product. One embodiment of the present invention additionally provides a graphical environment for creating and executing, either in an interpreted, compiled, or mixed fashion, UML diagrams that instantiate the realized objects.

One aspect of the present invention is directed to an action language for a UML model by specifying and connecting instances of the components that are declared in the UML model and whose operations have been implemented using the graphical programming or modeling environment or imported from external source program in languages such as Python, C, C++, FORTRAN, ADA, and HDL, and wrapped into a behavioral block model of the graphical programming or modeling environment. This block may be transparent to the modeling environment or opaque and generate interacting behavior by means of co-simulation. The interface of the block can be specified by the S-Function API used by Simulink®. This method may also include the step of representing the components of the model using functional blocks in a block diagram environment. The block diagram environment enables a user to program the behaviors of the UML model.

In another aspect of the present invention, a medium is provided for holding instructions executed in a computer to provide an action language for a UML model. The instructions are executed to receive components of the UML model.

The instructions are also executed to represent the components of the model using blocks in a block diagram environment. The medium may be computational hardware such as a central processing unit (CPU), graphics programming unit (GPU), digital signal processor (DSP), field programmable gate array (FPGA), and an application specific integrated circuit (ASIC), etc.

In another aspect of the present invention, a system provides a graphical action language for a Unified Modeling Language (UML) model. The system includes a UML modeling environment for specifying and connecting instances of components of the UML model. The skilled practitioner in the art will acknowledge that in UML, there is no semantic difference between components and classes and any functionality described for components can be practiced for classes. The system also includes a publishing tool for representing the components of the model using blocks in a block diagram environment, wherein the block diagram environment enables a user to model behaviors of the UML model.

An element of the UML model as referred to herein, may be one or more classifiers, and combinations thereof, that describe structural and behavioral features such as operations that are declared in classes. This includes association, class, component, datatype, interface, node, signal, as well as extensions of these modeling elements such as a subsystem that can be described as a stereotype of a class. It also includes instances of those classifiers such as objects that are instances of classes and links that are instances of associations. It furthermore includes UML model elements that specify how messages are exchanged over time among objects during an instance of an interaction.

The illustrative embodiment of the present invention is directed to a graphical programming or modeling environment in which a graphical model is executed in an interpreted, compiled, or mixed fashion, or in which code is generated for the model. In the description of the illustrative embodiment, the simulation of the model is also referred to as the interpreted execution of the model. In one aspect of the invention, a graphical programming or modeling environment enables a user to graphically program the behavior of a Unified Modeling Language (UML) model. The graphical programming or modeling environment represents a software or hardware system as a collection of blocks interconnected by lines. Blocks are entities of the system that perform given functions in the system.

In the illustrative embodiment of the present invention, a UML model may be exported into a text-based format, such as the XML Metadata Interface (XMI) format. The graphical programming or modeling environment may import the UML model and represent the UML model using behavioral blocks provided in the graphical programming or modeling environment. The illustrative embodiment may provide a publishing tool for representing the components of the UML model using hierarchical functional blocks in the graphical programming or modeling environment. The graphical programming or modeling environment enables a user or programmer to graphically define the behaviors of the UML model so that the UML model can be executed. The UML model can be modified based on the execution results. Furthermore, code can be generated from the graphical model that captures behavior of the UML model, and this code can be included in the UML model as its implementation.

The illustrative embodiment will be described below solely for illustrative purposes relative to a time-based block diagram environment and/or a state and flow diagram environment. Although the illustrative embodiment will be described relative to a time-based block diagram environment and/or a state and flow diagram environment, one of skill in the art will appreciate that the present invention may apply to other graphical programming or modeling environments, as long as the block diagram model has some notion of semantics that allows it to be interpreted or transformed into an executable for a computer processor/microcontroller, directly synthesized in general-purpose and application-specific hardware, or synthesized into wetware. For example, the illustrative embodiment may apply to physical modeling and in general 'plant' models, and to non-software (or HDL) bound components.

An exemplary state-based and flow diagram and time-based block diagram may be provided in Stateflow® and Simulink®, respectively, both from The MathWorks, Inc. of Natick, Mass. The illustrative embodiment will be described relative to Stateflow® and/or Simulink®. Nevertheless, those skilled in the art will appreciate that the present invention may be practiced relative to other environments for capturing behavior. An example of a textual environment is MATLAB® from The MathWorks, Inc., of Natick, Mass. Examples of graphical models include but are not limited to those facilitated by SimEvents from The MathWorks, Inc., of Natick, Mass., LabVIEW from National Instruments Corporation of Austin, Tex. or to any tool that provides capabilities to capture behavior of UML models with extension to flow modeling of continuous or discrete data items between blocks and with extension to modeling properties of interconnected blocks as a set of mathematical equations to be solved.

Simulink® provides tools for time-based modeling and simulation of a variety of dynamic systems in one integrated, graphical environment. Simulink® enables users to design a block diagram for a dynamic system, simulate the system's behavior, analyze the performance of the system, and refine the design of the system. Simulink® allows users to design models of systems through a user interface that allows drafting of block diagrams representing systems. All of the blocks in a block library provided by Simulink® and other programs are available to users when the users are building the block diagram. Individual users may be able to customize this block library to: (a) reorganize blocks in some custom format, (b) delete blocks they do not use, and (c) add custom blocks they have designed. The blocks may be dragged through some human-machine interface (such as a mouse or keyboard) from the block library onto the window (i.e., model canvas).

Simulink® includes a block diagram editor that allows users to perform such actions as draw, edit, annotate, save, and print out block diagram representations of systems. The block diagram editor is a graphical user interface (GUI) component that allows drafting of block diagram models by users. In Simulink®, there is also a textual interface with a set of commands that allow interaction with the graphical editor, such as the textual interface provided in MATLAB®. Using this textual interface, users may write special scripts that perform automatic editing operations on the block diagram. Simulink® also allows users to simulate the models to determine the behavior of the systems. Simulink® includes a block diagram execution engine that carries out the task of compiling and linking the block diagram to produce an "in-memory executable" version of the model that is used for generating code and/or simulating a block diagram model.

Stateflow® provides a graphical environment for modeling and designing state transition systems. Stateflow® describes complex system behavior using finite state machine theory, flow diagram notations, and state-transition diagrams. Stateflow® models state diagrams that graphically represent hierarchical and parallel states and the event-driven transitions between the states of the systems. Stateflow® is integrated with Simulink®, which enables each of the state diagrams to be represented as its own block. Based on the state diagrams created in Stateflow®, Simulink® executes the systems to analyze the behavior of the systems. This provides Stateflow® with a modularization mechanism. In a Simulink® model, one Stateflow® chart can be separated from another by means of a well-defined interface that can convey data and control. As such the interaction between charts can be limited, which provides modularity to a design that allows a complexity beyond what would have been possible without such interfaces. Optionally, direct interaction between Stateflow® charts can implemented by the designer.

Different forms of code can be generated from a Stateflow® chart. This includes C, C++, and HDL. If the execution of a Stateflow® model is required to be sequential, facilities to establish a unique execution order can be employed. This includes ordering of transition and state evaluations. This ordering can be done automatically or explicitly provided by the user. An implicit ordering based on the geometry of the diagram can be applied instead, or a mixture of the approaches can be used.

A plurality of actions can be modeled in a Stateflow® chart. For example, condition actions are evaluated when a condition is evaluated, event actions are evaluated when an event occurs and a corresponding transition is executed, and state entry actions are executed when a state becomes active. These actions may be directly connected to a Simulink® model. Additionally, a Stateflow® chart may invoke a function-call in a Simulink® model.

FIG. 1 depicts an exemplary system 2 for implementing the illustrative embodiment of the present invention. The system 2 may include a UML modeling environment 4 and a graphical programming or modeling environment 8. The UML modeling environment 4 enables a user to build an abstract UML model 5 that complies with UML standards. The UML modeling environment 4 may be provided by various UML tools, such as Rational Software Architect from IBM of White Plains, N.Y., Rhapsody and TAU-2 from Telelogic AB, Sweden, Studio from Artisan, etc. With the UML tools, the user may create and edit UML diagrams that follow the graphical notation of the UML standards. An exemplary UML model will be described below in more detail with reference to FIG. 6.

The abstract model 5 can be exported into a text-based data format 6. The text-based data format 6 may contain information on the graphical and non-graphical aspects of the model 5. The text-based data format 6 may be described using the XML Metadata Interface (XMI) format. One of ordinary skill in the art will appreciate that the text-based data format 6 may be described using other markup languages, such as Hypertext Mark-up Language (HTML) and Standard Generalized Mark-up Language (SGML). Further, the text-based data format need not be a markup language format. For example, the text-based data format could be a text format or other canonical format. An exemplary text-based data format will be described below in more detail with reference to FIG. 7. While a text-based data format is described here for illustrative purposes, the invention is not limited to text format and may also 'read' and transform the elements of a UML model using a direct programming API for accessing the UML information. For example, an alternative embodiment of the invention may have a programmatic interface using the EMF UML2 package of Eclipse.

The text-based data format 6 may be imported into the graphical programming or modeling environment 8, such as a time-based block diagram environment and/or a state and flow diagram environment. The illustrative embodiment may provide a tool for reading and analyzing the text-based data format 6 and generating a block diagram model 9 that can be simulated or executed in the graphical programming or modeling environment 8. With the block diagram model 9, the graphical programming or modeling environment 8 enables a user or programmer to realize the UML model 5 so that the UML model can be executed in an interpreted, compiled, or mixed fashion. One of ordinary skill in the art will appreciate that the time-based block diagram environment or state and flow diagram environment is an exemplary graphical programming or modeling environment and the present invention may apply to other graphical programming or modeling environments, including state-based, event-based, data flow diagrams, physical system diagrams, and entity flow networks.

Figure 2:
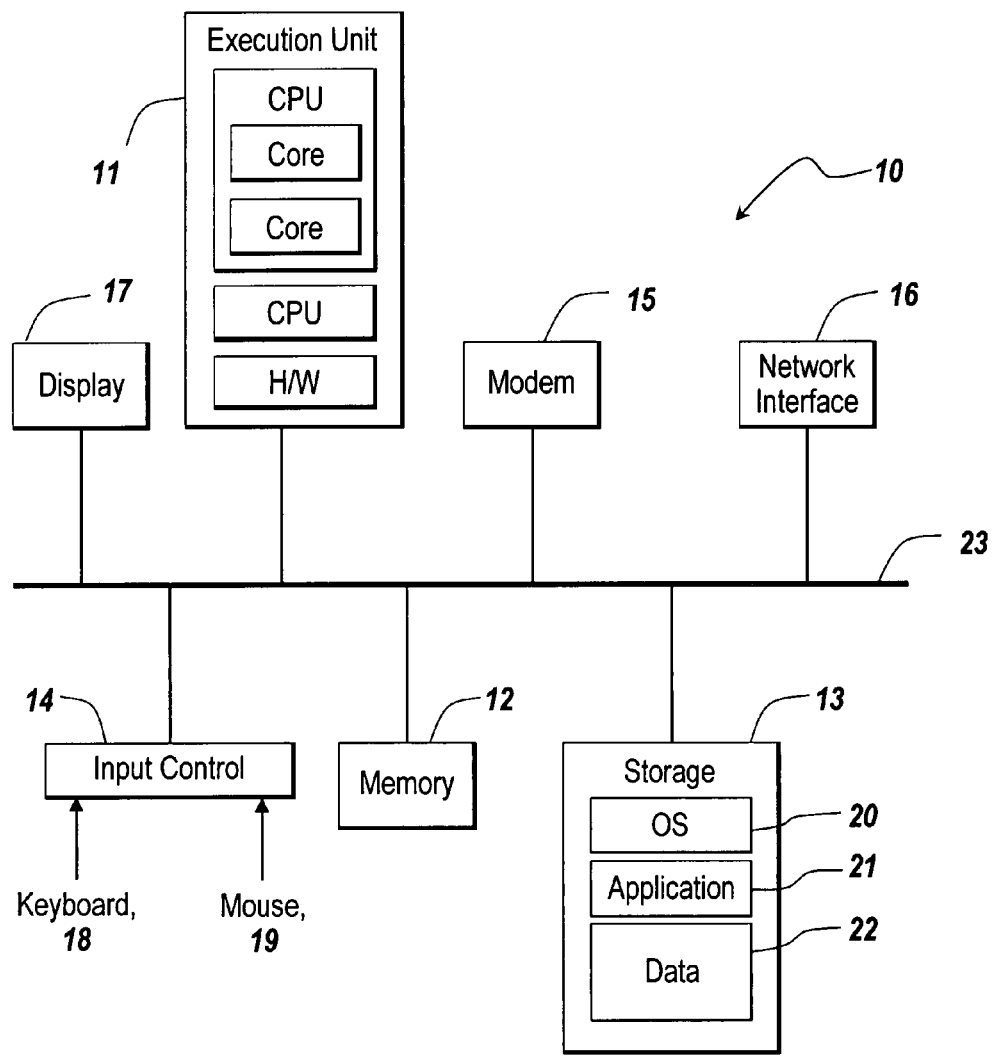
FIG. 2 is an exemplary electronic device suitable for practicing the illustrative embodiment of the present invention.

FIG. 2 is an exemplary computing device 10 suitable for practicing the illustrative embodiment of the present invention. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include an execution unit 11, memory 12, storage 13, an input control 14, a modem 15, a network interface 16, a display 17, etc. The execution unit 11 controls each component of the computing device 10 to provide a programming or modeling environment. The memory 12 temporarily stores instructions and data and provides them to the execution unit 11 so that the execution unit 11 operates the computing device 10 and runs the modeling or programming environment. The storage 13 usually contains software tools for applications. The storage 13 includes, in particular, code 20 for the operating system (OS) of the device 10, code 21 for applications running on the operation system including applications for providing the modeling or programming environment, and data 22 for models in the programming or modeling environment. Those of ordinary skill in the art will appreciate that the application can be stored in the memory 12 as well, much like the data, and even the OS, or they can be stored on the network described below with reference to FIG. 3.

Optionally, the computing device 10 may include multiple Central Processing Units (CPUs) for executing software loaded in the memory 12, and other programs for controlling system hardware. Each of the CPUs can be a single or multiple core processor. The code loaded in the memory 12 may run in a virtualized environment, such as in a Virtual Machine (VM). Multiple VMs may be resident on a single processor. Also, part of the application could be run in hardware (H/W), for example, a graphics processing unit (GPU) or by configuring a field programmable gate array (FPGA) or creating an application specific integrated circuit (ASIC).

The input control 14 may interface with a keyboard 18, a mouse 19, and other input devices. The computing device 10 may receive through the input control 14 input data necessary for creating models, such as the selection of the attributes and operations of components in the models. The computing device 10 may also receive through the input control 14 input data necessary for controlling the execution of the models. The computing device 10 may present in the display 17 user interfaces for the users to create, edit, simulate, and execute the models. The resources depicted in FIG. 2 may be connected to each other through the bus 23. The bus 23 may be an on-chip, off-chip or network bus. The bus 23 may include a control-area network (such as CAN, FlexRay, TTP, ARINC for e.g. Automotive and avionic applications) bus.

Figure 3:
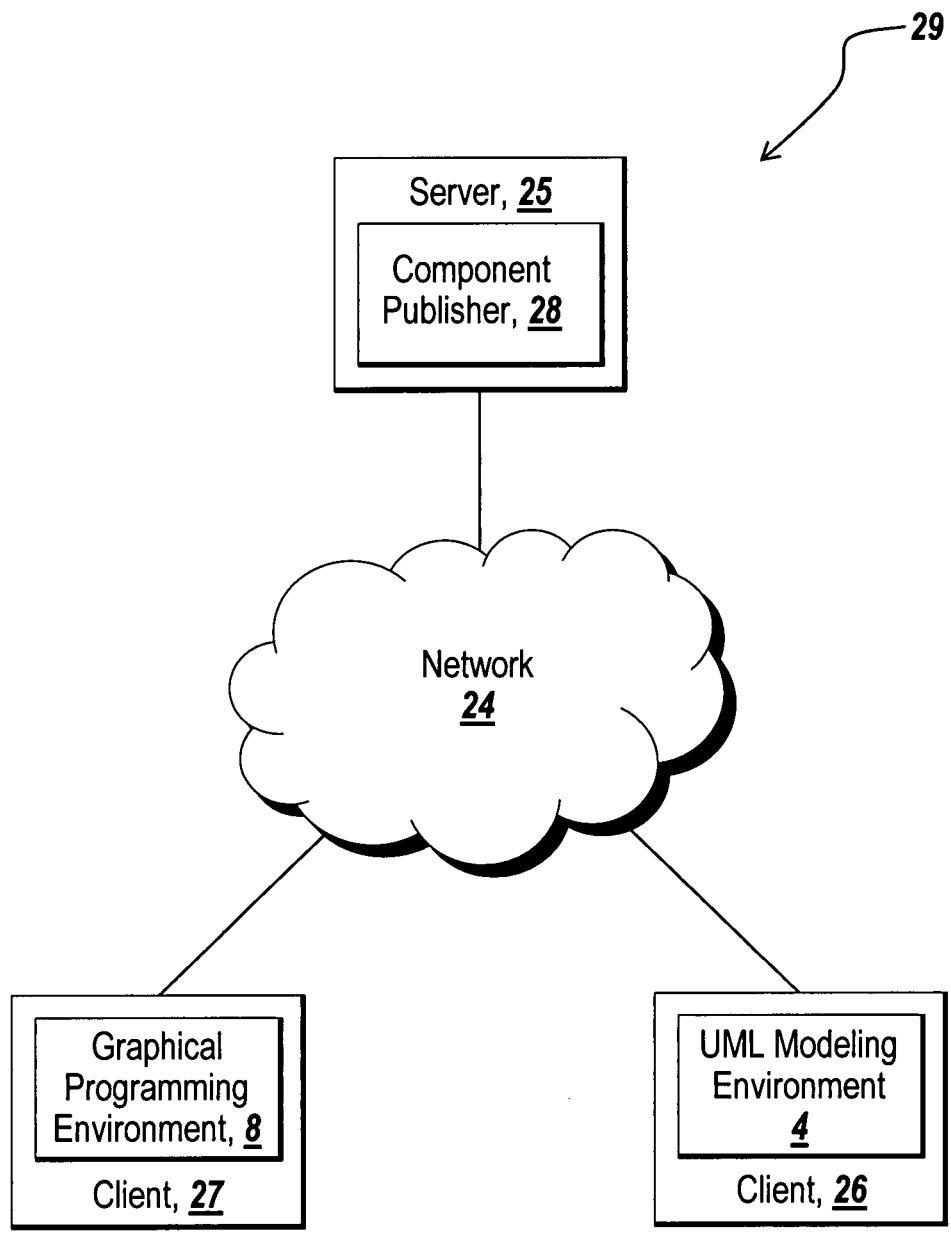
FIG. 3 depicts an exemplary network environment suitable for the distributed implementation of the present invention.

FIG. 3 depicts an exemplary network environment 23 suitable for the distributed implementation of the illustrative embodiment. A server 2 and clients 6 and 8 may be coupled to the network 4 through communication links. The network interface 16 and the modem 15 of the computing device 10 enable the server 25 to communicate with the clients 26 and 27 through the communication network 24. The communication network 24 may include a control-area network (such as CAN, FlexRay, TTP, ARINC for e.g. Automotive and avionic applications), Internet, intranet, LAN (Local Area Network), WAN (Wide Area Network), MAN (Metropolitan Area Network), Wireless, Optical, etc. The communication facilities can support the distributed implementations of the present invention. The network interface may employ a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above.

In the illustrative embodiment, the client 26 may include a UML modeling environment 4 that enables a user to build a UML model. The client 26 may send the UML model to the server 25 for converting the UML models into a different format so that the UML model can be used in other modeling environments. The server 25 may include a publishing tool 28 for generating a corresponding representation of the components of the UML models that can be used in the graphical programming or modeling environment 8, such as blocks in block diagram models. This representation may be in the form of a library file. This library may only contain blocks that have a corresponding representation in the UML model, and so restrict the user to only use blocks with a UML interpretation that are allowed.

Likewise, a block library may be provided that is configured towards a specific platform. For example, a library may only contain blocks that facilitate part or all of the standardized software services of Autosar. This may include blocks that correspond to the send and receive Autosar FlowPort interface. These blocks may be provided in a general purpose interface as well and they may also be made available otherwise.

In order to convert the UML model, the publishing tool 28 may use the text-based data format 6 exported from the UML model 5. The text-based data format 6 contains metadata of the UML model. The publishing tool 28 may read and analyze the text-based data format 6 and generate block diagrams for the components of the UML models based on the information contained in the text-based data format 6. The server 25 then provides the block diagrams to the client 27.

The client 27 may include the graphical programming or modeling environment 8 that enables a user to build and simulate/execute a block diagram model. The client 27 may receive from the server 25 the block diagrams of the components of the UML models and realize the methods of the components in the graphical programming or modeling environment 9. The realization of the methods of the components enables the UML model 5 to be simulated or executed so that the user can determine the behavior of the model 5. Those of ordinary skill in the art will appreciate that the network structure is illustrative and the present invention can be practiced with different structure. For example, the publishing tool 28 can reside and run on the client 27.

In another embodiment, the client 26 or 27 may download the publishing tool 28 from the server 25 and perform the conversion process on the client 26 or 27.

In one embodiment the present invention can be deployed on networked nodes, such as UNIX or Windows/XP terminals. It contains a workflow server that is notably responsible for managing a process between activities on several client applications and for maintaining the consistency of the UML model that is shared between these client applications.

The graphical programming or modeling environment client may request importing a UML model and observes the modifications of the model that result of user actions. On specific execution point of the process, it forwards these modifications to the server. The server is responsible for creating an updated version of the shared UML model with modified or new UML model elements. The server subsequently informs the other client applications that are part of the collaborative process of these modifications.

Figure 4:
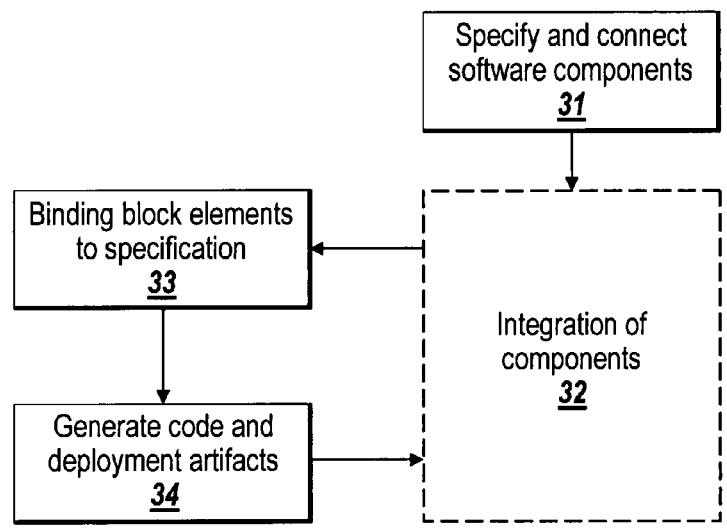
FIG. 4 shows an exemplary operation of the illustrative embodiment of the present invention.

FIG. 4 shows an exemplary operation of the illustrative embodiment. A software architect may design a software framework by using the graphical notation of the UML standard in the UML modeling environment 4 (step 31). The software architect can create and edit a UML model following the UML standard. The software architect can specify and connect software components of the UML model using UML tools that provide the UML modeling environment 4. In order to realize the UML model or the components of the UML model so that the UML model can be executed (step 32), the UML model or a representation of it is sent to the graphical programming or modeling environment 8. A realization of a part of the UML model that has been provided by code such as C, C++, Java, Python, and FORTRAN can be represented in the graphical programming or modeling environment 8 by embedding it into S-function interface code. This wrapper code is then called from the graphical model environment 8 during execution or for alternate analysis purposes such as data type propagation, trimming, linearization, and decision coverage.

The graphical programming or modeling environment 8 enables a system designer, programmer or engineer to design, simulate, implement or test the dynamic features of a system. The graphical programming or modeling environment 8 receives the UML model and binds its elements to the specification of the UML model or the components of the UML model to represent the UML model or the components of the UML model in the graphical programming or modeling environment 8 (step 33). The representation of the UML model or the components of the UML model enables the user to realize the methods of the UML model or the components of the UML model in the graphical programming or modeling environment 8. The graphical programming or modeling environment 8 can then simulate or execute the model to determine the dynamic, numerical and real-time behavior of the model. The graphical programming or modeling environment 8 can also generate code for the model so that the code can be deployed on embedded-software, rapid-prototyping and/or hardware targets (step 34). Alternately, mechanical, electrical, or other physics based implementations may be designed to the model specification.

Configuration mechanisms allow the generated code to be tailored to the needs and wishes of the user. For example, a data store memory block can be used to specify the memory location of a variable. Alternate mechanisms to specify the memory location of a variable exist and include the location as part of its data type or being read from an external file. Further configuration mechanisms include directives for the code generation such as whether a function in software should have its arguments passed in or whether it should be global and whether the function data should be kept local to the function or whether it can be stored at the model level. Similarly, it can be specified whether a function should be reusable, the order of the arguments on the argument list, whether structured data types should be employed for each of the arguments or whether it should be a flat list, which include files to use to obtain externally defined data types, and the like.

Figure 5:
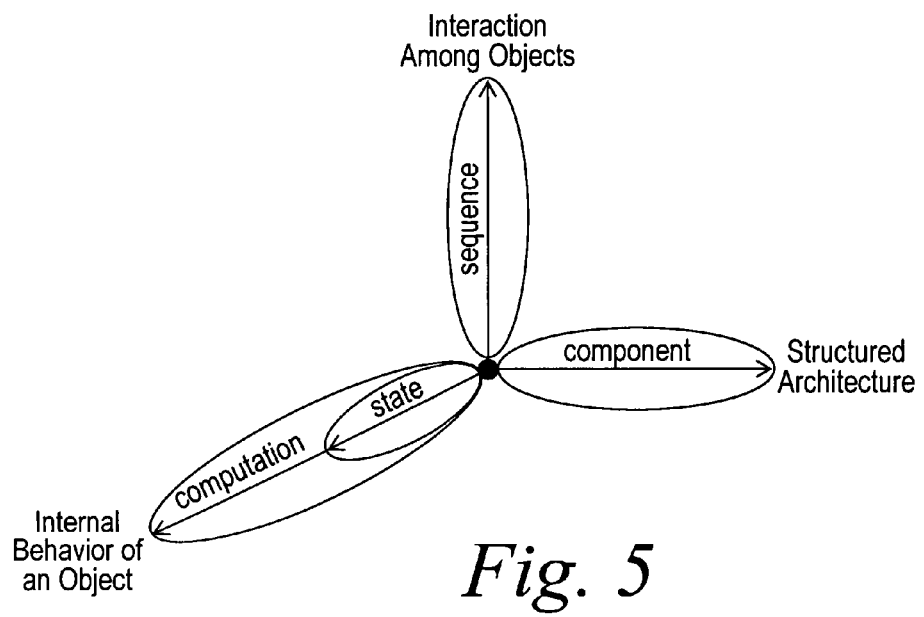
FIG. 5 depicts three components of an extended UML modeling environment to clarify the relations that part of the illustrative embodiment of the present invention.

FIG. 5 illustrates the extended aspects of a UML modeling environment with the illustrative embodiment of the present invention. The UML and UML profile standards provide various diagrams including structure diagrams and behavior diagrams. The structure diagrams show the structural architecture of a UML model. The structure diagrams may include a class diagram, a component diagram, an object diagram, a composite diagram, a deployment diagram or a package diagram. The behavior diagrams show the internal behavior of objects in the UML model. The behavior diagrams may include an activity diagram, an interaction diagram, a use case diagram or a state machine diagram. The interaction diagram displays interactions among objects in the UML model. The interaction diagram may include a sequence diagram, a communication diagram, an interaction overview diagram, or a timing diagram. These various diagrams enable a user to view many different aspects of the same UML model.

The state machine diagram allows the user to designate the state of a class or a component in a UML model. The illustrative embodiment of the present invention extends the specification of the behavior of a UML model beyond the state designation of the UML model. The illustrative embodiment extends the specification of the behavior of a UML model to Simulink® and/or Stateflow® diagrams, which support state-based numerical and computational real-time behavior of a dynamic system. The Simulink® and/or Stateflow® environments may integrate mathematical computing and visualization. The illustrative embodiment may support the resolution of numerical algorithms with matrices, complex numbers, linear algebra, etc.

The graphical programming or modeling environment of the illustrative embodiment may support dynamically typed programming. In a dynamically typed programming environment, types are assigned to each data value in memory at runtime, rather than assigning a type to a static, syntactic entity in the program source code. The dynamically typed programming environment catches errors related to the misuse of values at the time the erroneous statement or expression is executed. In contrast, types are assigned to sets of values based on the program's source code in a statically typed programming environment. Static type disciplines operate on program source code rather than on the program execution. Therefore, in the statically typed programming environment, certain kinds of errors are detected without executing the program.

Figure 6:
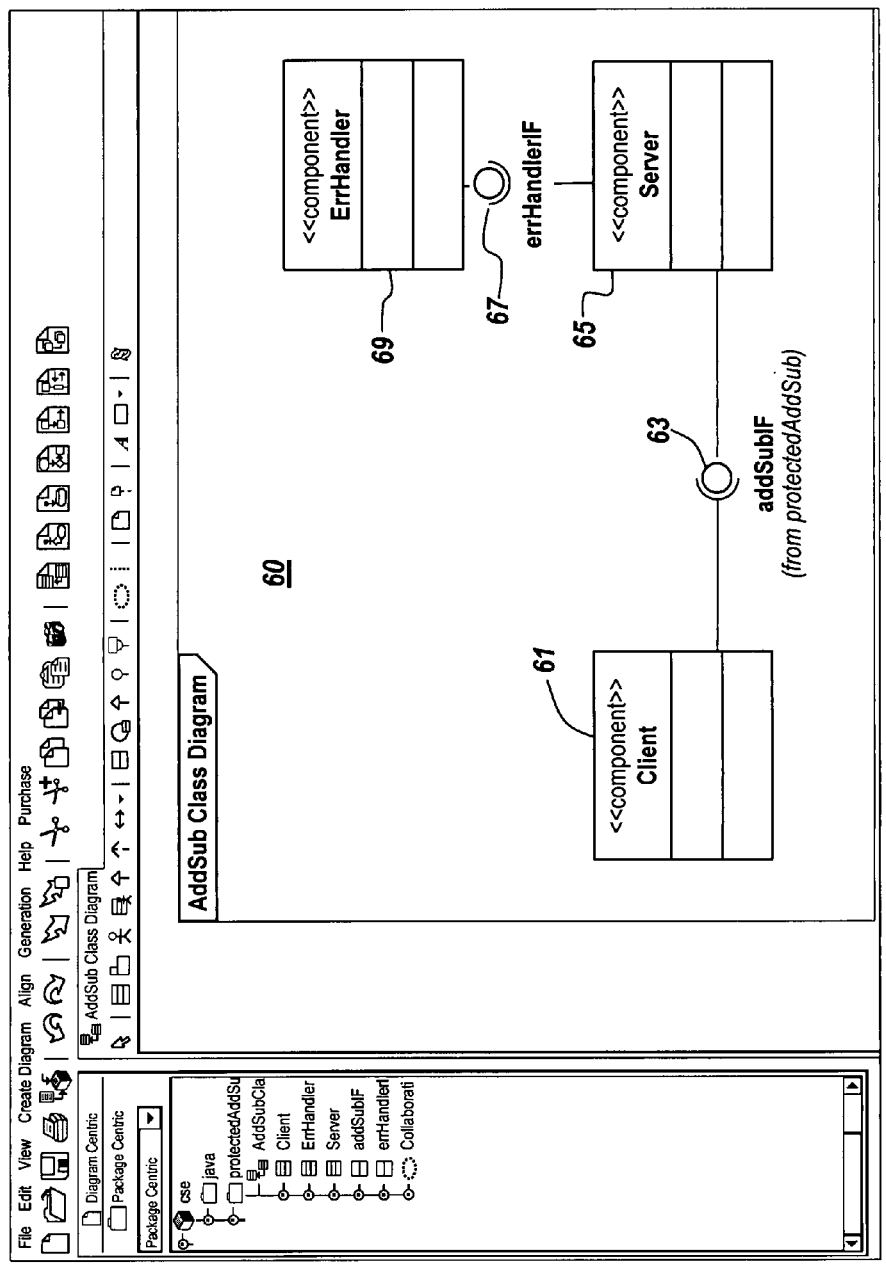
FIG. 6 is an exemplary component diagram of a UML model.

FIG. 6 is an exemplary component diagram of a UML model. A UML component diagram depicts how a software system is split up into physical or computational components, such as files, headers, link libraries, modules, executables and packages, and shows the dependencies among these components. In the illustrative embodiment, the diagram 60 depicts a system for adding and subtracting input integers, and handling the error occurring in the addition and subtraction operations. The component diagram includes a Client 61, a Server 65 and an errHandler (ErrHandler) 69 as its components. The component diagram 60 also includes an interface (addSubIF) 63 between the Client 61 and the Server 65, and another interface (errHandlerIF) 67 between the server 65 and an error handler (ErrHandler) 69. With the user interfaces provided in the UML modeling environment, a user can specify that the Client 61 requests the addition or subtraction of input parameters and the Server returns the results of the addition or subtraction. In the illustrative embodiment, the interface (addSubIF) 63 is specified with adding and subtracting operations of input parameters. The interface (errHandlerIF) 67 may be specified with error handling operations. The UML model, however, does not include methods for realizing the adding and subtracting operations and error handling operations. The illustrative embodiment provides a graphical programming or modeling environment for graphically programming the methods of the adding and subtracting operations and error handling operations. Those of skill in the art will appreciate that the UML model 60 is illustrative and not limiting the scope of the present invention.

The UML model may then be exported into a text-based data format, such as an XML Metadata Interchange (XMI) format. FIG. 7 is an exemplary XMI file 70 into which the UML model is exported. The XMI format is a standard for exchanging metadata information via the Extensible Markup Language (XML). The XMI format is the official Object Management Group (OMG) specification for exchanging model information between modeling tools and repositories. Since the XMI format is an XML standard, it is human-readable and can be viewed in a normal text browser. The XMI format can be read by the publishing tool 28 and saved as an XML document.

The XMI file 70 may include a top level object defining the XMI file. The top level object may also include information on an XMI version and a creation date. The XML file may include sub-level objects, such as <XMI.header> 71 and <XMI.content> 72. The <XMI.header> object 71 may contain information on the exporter of the model, such as an exporter name and an exporter version. The <XMI.content> object 72 contains the metadata information of the model. The <XMI.content> object 72 may contain an object 73 for containing information on the components and interfaces of the components in the model. The <XMI.content> object 72 may also include objects 74 and 75 for containing information on various diagrams of the UML model, such as a class diagram and a sequence diagram. The XMI file 70 may include information on other UML diagrams, such as a UML deployment diagram. The object 73 may include sub-objects 76-80 for containing data for the components and the interfaces between the components of the model. The portion 78 of the XMI file 70 that describes the interface (addSubIF) 63 in more detail is provided as follow.

```
<UML:Interface xmi.id = 'Ifd28773m10964b9459cmm7f16' name =
'addSubIF' visibility = 'public'
   isSpecification = 'false' isRoot = 'false' isLeaf = 'false' isAbstract = 'false'>
      <UML:ModelElement.taggedValue>
         <UML:TaggedValue xmi.id = 'Ifd28773m10964b9459cmm7f30'
isSpecification = 'false'>
            <UML:TaggedValue.dataValue><p>Defines an interface with two
operations for adding and substracting
```

-continued

```
integers</p></UML:TaggedValue.dataValue>
      <UML:TaggedValue.type>
        <UML:TagDefinition xmi.idref = 'Ifd28773m10964b9459cmm7f42'/>
      </UML:TaggedValue.type>
    </UML:TaggedValue>
  </UML:ModelElement.taggedValue>
  <UML:Classifier.feature>
    <UML:Operation xmi.id = 'Ifd28773m10964b9459cmm7f28' name = 'add'
visibility = 'public'
    isSpecification = 'false' ownerScope = 'instance' isQuery = 'false'
concurrency = 'sequential'
      isRoot = 'false' isLeaf = 'false' isAbstract = 'false'>
      <UML:BehavioralFeature.parameter>
        <UML:Parameter xmi.id = 'Ifd28773m10964b9459cmm7f2e' name = 'a'
isSpecification = 'false'
          kind = 'in'>
          <UML2:TypedElement.type>
            <UML:DataType xmi.idref = 'Ifd28773m10964b9459cmm7f40'/>
          </UML2:TypedElement.type>
        </UML:Parameter>
        <UML:Parameter xmi.id = 'Ifd28773m10964b9459cmm7f2c' name = 'b'
isSpecification = 'false'
          kind = 'in'>
          <UML2:TypedElement.type>
            <UML:DataType xmi.idref = 'Ifd28773m10964b9459cmm7f40'/>
          </UML2:TypedElement.type>
        </UML:Parameter>
        <UML:Parameter xmi.id = 'Ifd28773m10964b9459cmm7f2a' name =
'return' isSpecification = 'false'
          kind = 'return'>
          <UML2:TypedElement.type>
            <UML:DataType xmi.idref = 'Ifd28773m10964b9459cmm7f40'/>
          </UML2:TypedElement.type>
        </UML:Parameter>
      </UML:BehavioralFeature.parameter>
    </UML:Operation>
    <UML:Method xmi.id = 'Ifd28773m10964b9459cmm7f24' isSpecification
= 'false'
      isQuery = 'false'>
      <UML:Method.body>
        <UML:ProcedureExpression xmi.id = 'Ifd28773m10964b9459cmm7f26'
language = 'java'
          body = ''/>
      </UML:Method.body>
      <UML:Method.specification>
        <UML:Operation xmi.idref = 'Ifd28773m10964b9459cmm7f28'/>
      </UML:Method.specification>
    </UML:Method>
    <UML:Operation xmi.id = 'Ifd28773m10964b9459cmm7f1c' name = 'sub'
visibility = 'public'
    isSpecification = 'false' ownerScope = 'instance' isQuery = 'false'
concurrency = 'sequential'
      isRoot = 'false' isLeaf = 'false' isAbstract = 'false'>
      <UML:BehavioralFeature.parameter>
        <UML:Parameter xmi.id = 'Ifd28773m10964b9459cmm7f22' name = 'a'
isSpecification = 'false'
          kind = 'in'>
          <UML2:TypedElement.type>
            <UML:DataType xmi.idref = 'Ifd28773m10964b9459cmm7f40'/>
          </UML2:TypedElement.type>
        </UML:Parameter>
        <UML:Parameter xmi.id = 'Ifd28773m10964b9459cmm7f20' name = 'b'
isSpecification = 'false'
          kind = 'in'>
          <UML2:TypedElement.type>
            <UML:DataType xmi.idref = 'Ifd28773m10964b9459cmm7f40'/>
          </UML2:TypedElement.type>
        </UML:Parameter>
        <UML:Parameter xmi.id = 'Ifd28773m10964b9459cmm7f1e' name =
'return' isSpecification = 'false'
          kind = 'return'>
          <UML2:TypedElement.type>
            <UML:DataType xmi.idref = 'Ifd28773m10964b9459cmm7f40'/>
          </UML2:TypedElement.type>
        </UML:Parameter>
      </UML:BehavioralFeature.parameter>
    </UML:Operation>
    <UML:Method xmi.id = 'Ifd28773m10964b9459cmm7f18' isSpecification
= 'false'
```

```
        isQuery = 'false'>
      <UML:Method.body>
        <UML:ProcedureExpression xmi.id = 'Ifd28773m10964b9459cmm7f1a'
language = 'java'
          body = ''/>
      </UML:Method.body>
      <UML:Method.specification>
        <UML:Operation xmi.idref = 'Ifd28773m10964b9459cmm7f1c'/>
      </UML:Method.specification>
    </UML:Method>
  </UML:Classifier.feature>
</UML:Interface>
```

Figure 8:
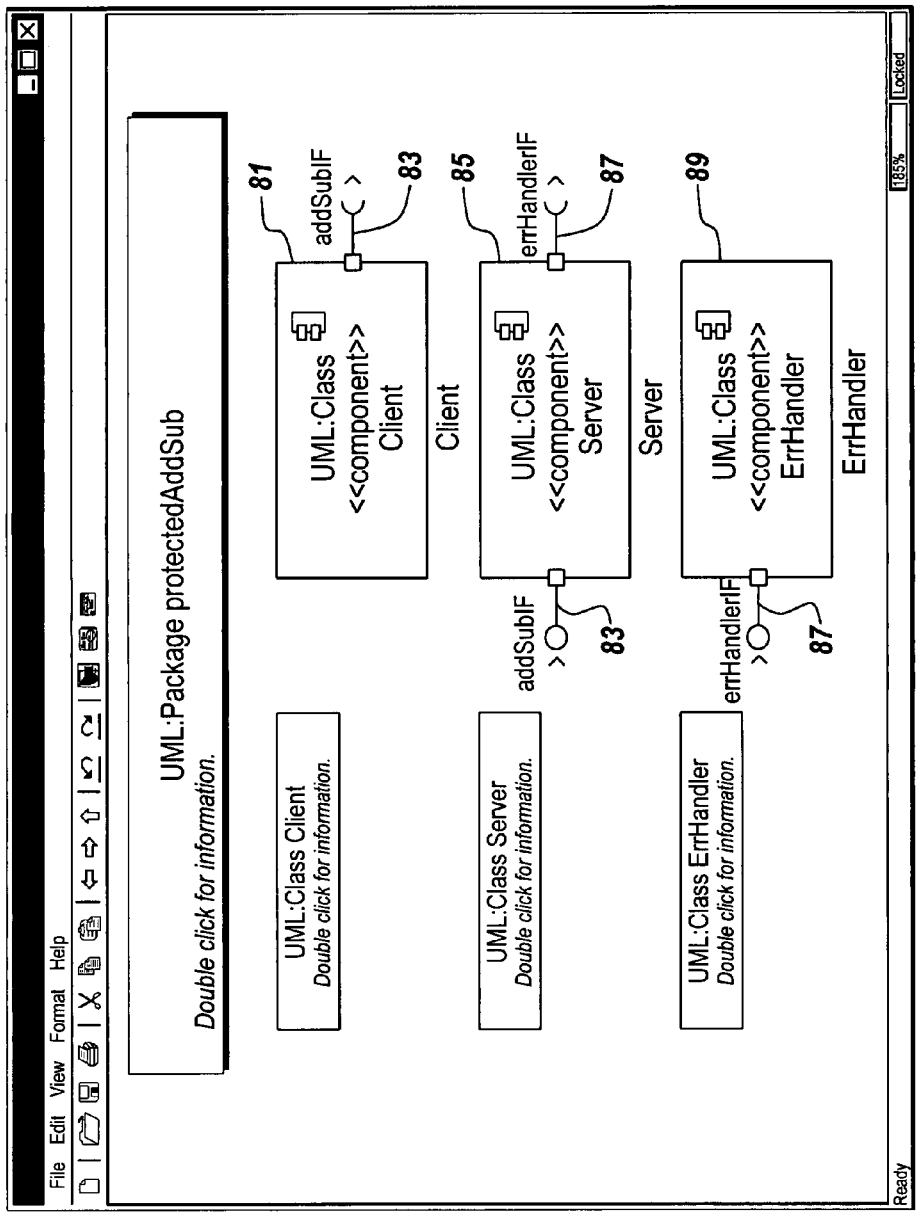
FIG. 8 shows an exemplary block diagram representing the components of the UML model in the block diagram environment.

The publishing tool 28 may read the XMI file 70 and generate hierarchical functional block diagrams using the information contained in the XMI file 70. FIG. 8 shows exemplary hierarchical functional blocks generated by the publishing tool 28. The components of the UML model are converted into the hierarchical functional blocks of the graphical programming or modeling environment 8. The Client block 81 may include sub-blocks and an interface for addSubIF 83. The Server block 85 may also include sub-blocks and interfaces for addSubIF 83 and errHandleIF 87. The ErrHandler block 89 may include sub-blocks and an interface for errHandleIF 87.

FIG. 8 shows model elements that provide active connections with the UML model representation. These elements are annotated by a 'Double click for information' comment. When opened, for example by a double click, a dialog or model may appear (for example of the interface or attributes) that is a representation of the UML model and is synchronized. Therefore, any changes made to either the UML model or the behavioral model are live reflected in the other model.

Figure 9:
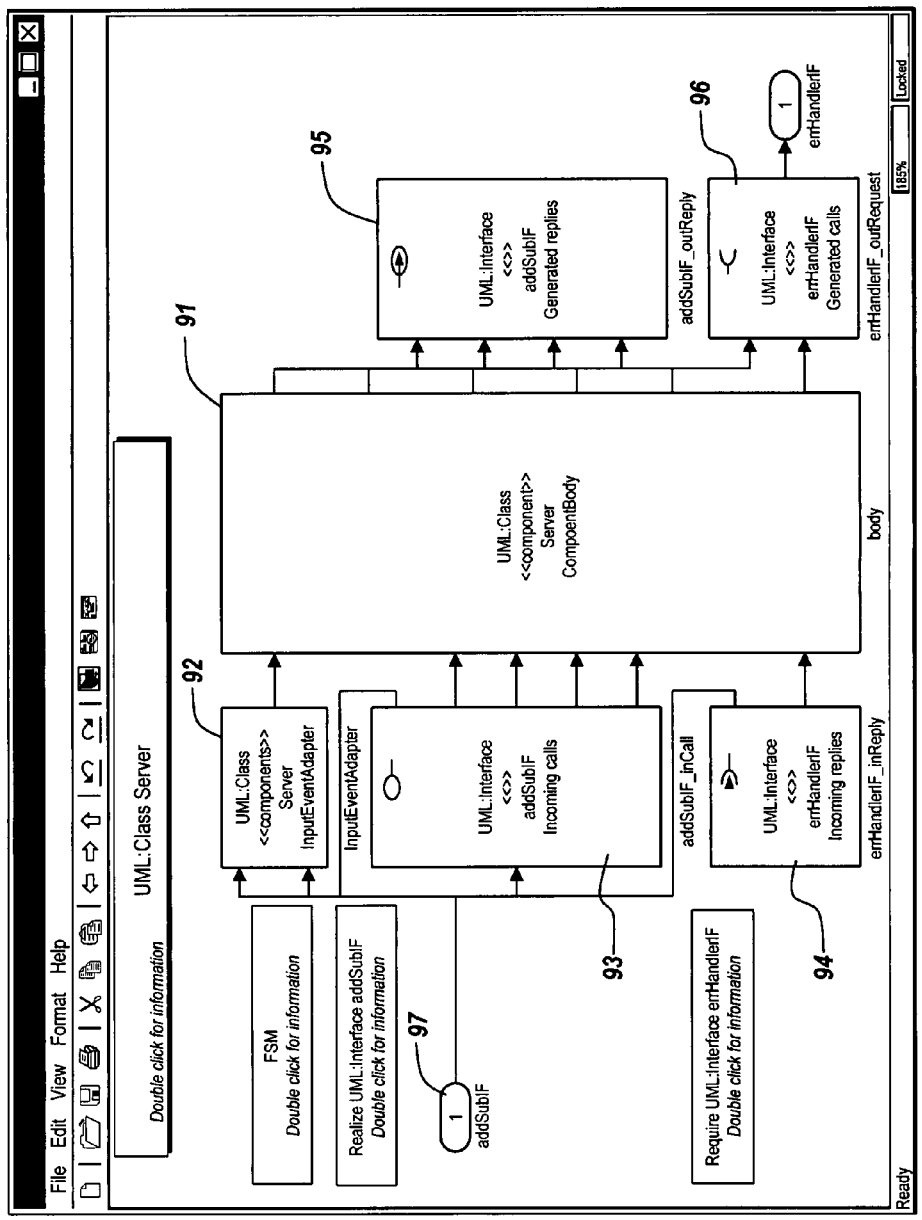
FIG. 9 shows exemplary sub-blocks of the Server block depicted in FIG. 8.

FIG. 9 shows exemplary sub-blocks of the Server block 85. In the preferred embodiment of the invention, this level of the generated model is hidden from the user. It serves to show the interface adapters around the core-body subsystem that contains the actual implementation of the methods of the operations that are declared by the interface In FIG. 9 the Server block 85 may include the sub-blocks 91-95 to implement the addition and subtraction operations and error handling operations specified in the UML model. The sub-blocks may be determined by analyzing the specification of the UML model and binding Simulink® and Stateflow® elements to the specification. For example, the InputEventAdaptor block 92 may receive input signals from the addSubIF inport 97 and generate triggering event signals for initiating the adding or subtracting operations by the body block 91. The addSub_inCall block 93 may also receive input signals from the addSubIF inport 97 and generate the input parameters for the adding or subtracting operation. The addSubIF Generated block 95 may return the results of the adding or subtracting operations based on the triggering event signals from the body block 91. The errHandleIF_outRequest block 96 may receive an error handling request from the body block 91 and output the request to the errHandlerIF outport 98 based on the triggering event signals from the body block 91. The errHandleIF_in Reply block 94 may receive the result of the error handling operations and feed it to the body block 91. Those of the ordinary skill in the art will appreciate the construction of the sub-blocks may be different depending on the construction algorithm in the publishing tool 28.

Figure 10:
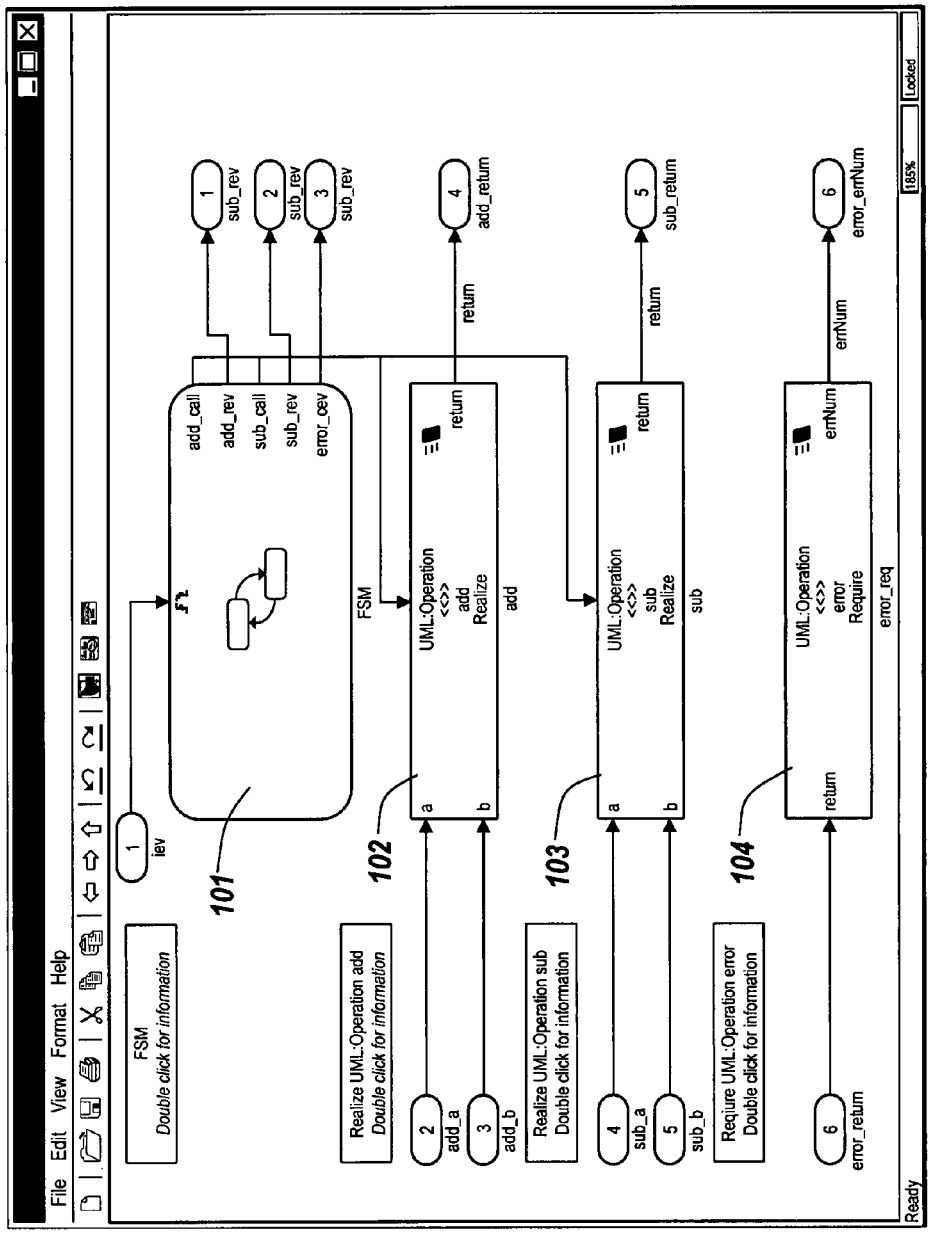
FIG. 10 depicts exemplary sub-blocks of the body block depicted in FIG. 9

FIG. 10 depicts another level of sub-blocks for the body block 91 depicted in FIG. 9. In the embodiment of the invention, this is the level at which the user graphically models the methods that comprise component behavior. The action language to model behavior may include time-based block diagrams, statecharts, entity flow diagrams, a control flow language, a dataflow language, a dynamically typed text-based language, and an imperative programming language. The skilled practitioner in the art recognizes that like formalisms that can be employed in addition or instead of these languages as well as that any number of permutations of these languages can be employed as combinations. The skilled practitioner further recognizes that restrictions on the languages used may be enforced.

In FIG. 10, the body block may include a FSM (Finite State Machine) block 101, an add block 102, a sub block 103, or an error handling request (error_req) block 104. The FSM block 101 may receive an input signal from the InputEventAdaptor block 92 and generate triggering signals for initiating the adding and subtracting operations and for returning the results of the adding and subtracting operations. The FSM block 101 may also generate a triggering signal for requesting an error handling. The add block 102 and subtract block 103 may realize the adding and subtracting operations, respectively. Within the add block 102 and subtract block 103, the user may add and connect blocks to realize the adding and subtracting operations, respectively. For example, the user may realize the add block 102 to return the result of the adding operation of input parameters. The subtract block 102 may be realized to return the result of the subtracting operation of the input parameters. The error_req 104 may realize the error handling request operation. Within the error_req block 104, the user may add and connect blocks to realize the error handling request operation. The error_req block 104 may be realized to return an error number indicating the status of the error. In the illustrative embodiment, the realization of the adding and subtracting operations and the error handling request operation are performed in the graphical programming or modeling environment by customizing the add block 102, sub block 103, and error_req block 104 using graphical elements or blocks provided in the graphical programming or modeling environment 8.

Figure 11:
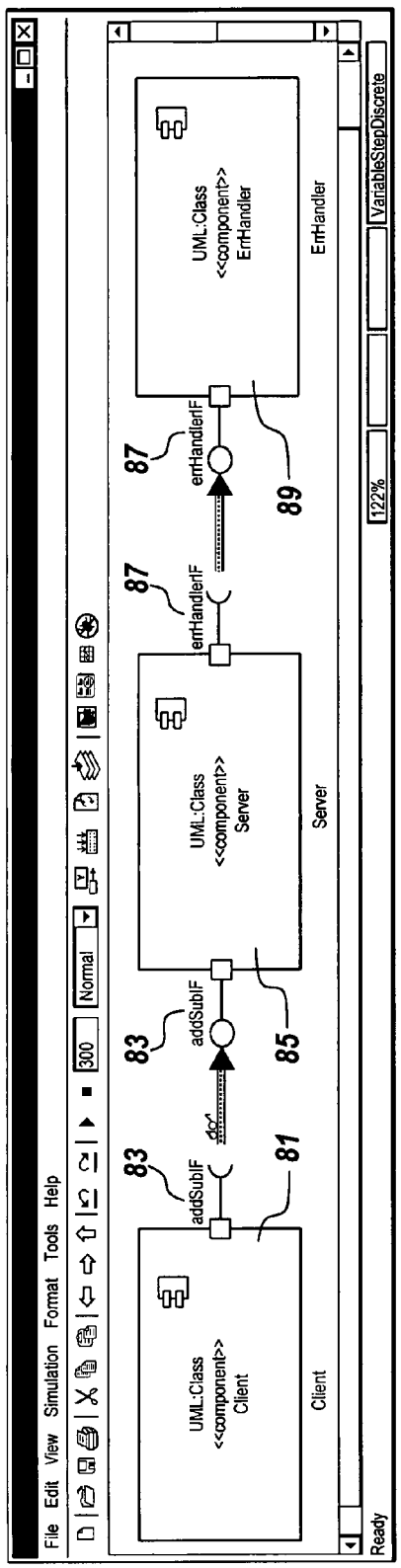
FIG. 11 is an exemplary block diagram that corresponds to a UML model.

After realizing the adding and subtracting operations and error handling operations in the graphical programming or modeling environment, the user may connect the published components to execute the model, as depicted in FIG. 11. FIG. 11 shows an exemplary block diagram that contains three instances of components, also referred to as runtime objects, that are linked through their compliant requester/provider interfaces. During execution, the 'requester' object may call an operation of the 'provider' object that it is linked to. To this end, the operations are defined in the interface. This component 'object' diagram can be simulated once the operations that are called have been realized in the graphical programming or modeling environment.

In FIG. 11, the addSubIF port 83 of the Client block 81 is coupled to the addSubIF port 83 of the Server block 85 and the errHandlerIF 87 port of the Server block 85 is coupled to the errHandlerIF port 87 of the ErrHandler block 89. Each of the connections is implemented as a bus, which is a set of connections. Each of the connections in this set may be a bus as well, which supports hierarchical structuring of sets of connections. The variables that are associated with a connection (also called signals in Simulink) may be arranged such that they are contiguous in memory when a computable representation is derived. If the data type of each of the connection variables is the same, the set of connections can be represented as an array, which allows for direct indexing. In general, a set of connections can be represented as a structure in the generated code and named access to each of the connection variables can be employed. The dot notation can be used to access hierarchically ordered connections. For example, if a set that consist of elements X and Y is called a bus B and X is a bus itself that represents the set of connections M and N, then the connection variable of M can be accessed by the B.X.M notation. The skilled practitioner in the art will recognize that other syntax and general set notation as well as operation semantics (such as set comprehensions) can apply.

In one aspect of the embodiment, the interface specification is represented by a bus. This set of connections then may include the set of arguments of a function call, which may be structured data types themselves and be passed by reference or value. The function-call initiator may be represented by a bus as well and the return value of the function call can be represented by a bus. Different permutations of combinations are possible and so the function-call initiator may be included in the same bus as the function arguments and the return value. This results in a bidirectional bus because the elements in the set of connections have mixed computational causality, one connection may be the input to a block while another connection in the set of connections is output of said block.

FIG. 11 further shows non-intrusive signal logging, indicated by the pair of glasses icon over the bus on the connection between Client block 81 and the Server block 85. This allows monitoring of the internals of the connection as the model is executed.

Once a block diagram model 9 has been constructed within the graphical programming or modeling environment 8, the model may be executed in the graphical programming or modeling environment 8. Simulink®, which provides an exemplary graphical programming or modeling environment 8, includes an execution engine for carrying out the task of compiling and linking the block diagram to produce an "in-memory executable" version of the model that is used for generating code and/or simulating or linearizing a block diagram model. Model execution is carried out over a user-specified time span for a set of user-specified inputs. The execution begins when the block diagram is compiled. The compile stage marks the start of model execution and involves preparing data structures and evaluating parameters, configuring and propagating block characteristics, determining block connectivity, and performing block reduction and block insertion. The preparation of data structures and the evaluation of parameters create and initialize basic data-structures needed in the compile stage. For each of the blocks, a method forces the block to evaluate all of its parameters. This method is called for all blocks in the block diagram. If there are any unresolved parameters, execution errors are thrown at this point. During the configuration and propagation of block and port/signal characteristics, the compiled attributes (such as dimensions, data types, complexity, or sample time) of each block (and/or ports) are setup on the basis of the corresponding functional attributes and the attributes of blocks (and/or ports) that are connected to the given block through lines. The attribute setup is performed through a process during which block functional attributes "ripple through" the block diagram from one block to the next following signal connectivity. This process (referred to herein as "propagation"), serves two purposes. In the case of a block that has explicitly specified its block (or its ports') functional attributes, propagation helps ensure that the attributes of this block are compatible with the attributes of the blocks connected to it. If not, an error is issued. Secondly, in many cases blocks are implemented to be compatible with a wide range of attributes. Such blocks adapt their behavior in accordance with the attributes of the blocks connected to them. This is akin to the concept of polymorphism in object-oriented programming languages. The exact implementation of the block is chosen on the basis of the specific block diagram in which this block finds itself. Included within this step are other aspects such as validating that all rate-transitions within the model yield deterministic results and that the appropriate rate transition blocks are being used.

The compilation step also determines actual block connectivity. In this step, the virtual blocks in the block diagram, which play no semantic role in the execution of a block diagram, are optimized away (removed) and the remaining non-virtual blocks are reconnected to each other appropriately. This compiled version of the block diagram with actual block connections is used from this point forward in the execution process. The way in which blocks are interconnected in the block diagram does not necessarily define the order in which the equations (methods) corresponding to the individual blocks will be solved (executed). The actual order is partially determined during the sorting step in compilation. Once the compilation step has completed, the sorted order cannot be changed for the entire duration of the block diagram's execution.

Following the compilation stage is the model link stage. After linking has been performed, code may or may not be generated. If code is generated, the model is simulated/executed through accelerated simulation mode in which the block diagram model (or portions of it) is translated into either software modules or hardware descriptions (broadly termed code). If this stage is performed, then the stages that follow use the generated code during the execution of the block diagram. If code is not generated, the block diagram may execute in interpretive mode in which the compiled and linked version of the block diagram may be directly utilized to execute the model over the desired time-span. This interpretive mode of execution is suitable for getting fine-grained signal traceability. Block diagram programming software can be integrated with other software environments that are suitable for modeling and simulating special classes of systems. Models can be tested directly in hardware. Those skilled in the art will recognize that when users generate code, they may choose to not proceed further with the block diagram's execution. They may choose to take the code and deploy it outside of the confines of the modeling software environment. This is normally the last step in the design of dynamic systems in a block diagram software package.

Dynamic systems are typically modeled as sets of differential, difference, algebraic, and/or recursive equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, a parameter is the length of pendulum and for the filter example; a parameter is the values of the filter taps.

Types of mathematical models used in the study of dynamic systems include differential equations, difference equations, algebraic equations, and hybrid models. Inherent in four of the classes of systems (ODE, difference equations, algebraic equations and composite) is the notion of system sample time. The sample-time is the time interval at which the inputs, state, or outputs (collectively referred to as the results) of the system are traced as time progresses. Based on sample times, a system can be described as a discrete-time system, continuous-time system and hybrid system.

A discrete-time system is a system in which the evolution of the system results is tracked at finite intervals of time. In the limit as the interval approaches zero, the discrete-time system becomes a continuous-time system. The intervals of time may be periodic or non-periodic. Sometimes, non-periodic rate systems are referred to as non-uniform rate systems meaning that there is no periodic rate at which the response can be tracked. A continuous-time system is a system in which the evolutions of the system results are continuously changing. Continuous-time signals change during numerical integration. An example of a continuous-time system is one described by an ODE. There can also be algebraic or composite continuous-time systems. A hybrid system is a system with both discrete-time and continuous-time elements.

If a system has only one sample time, it is said to be single-rate. If a system has multiple sample times, it is said to be multi-rate. Multi-rate systems can be evaluated (executed) using either a single-tasking form of execution or a multi-tasking form of execution. When multi-tasking execution is used, it conforms to rate monotonic scheduling principals as defined by Liu, C. L., and Layland, J. W. *Scheduling Algorithms for Multiprogramming in a Hard-Real-Time Environment*. ACM 20, 1 (January 1973), 46-61. Systems may also be categorized by the type of numerical integration solver being used. A fixed-step system is one that uses a fixed-step solver. Fixed-step solvers typically use explicit methods to compute the next continuous state at fixed periodic intervals of time. A variable-step system is one that is using a variable-step solver. A variable-step solver can use either implicit or explicit methods to compute the next continuous state at non-periodic intervals of time. Generally, variable-step solvers use a form of error control to adjust the interval size such that the desired error tolerances are achieved.

Figure 12:
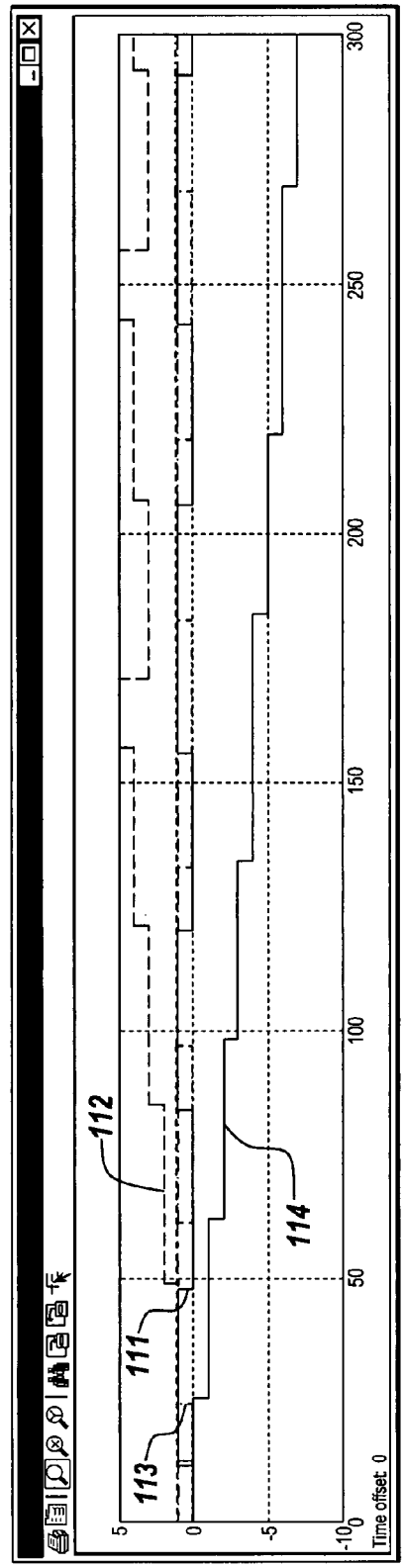
FIG. 12 shows exemplary signals generated by the simulation/execution of the block diagram depicted in FIG. 11.

FIG. 12 depicts exemplary signals generated in the simulation or execution of the model and monitored in the interface 83 between the Client block 81 and the Server block 85 in FIG. 11. The signals 112 indicate that the adding operations are performed by the triggering event signals 111. The signal 114 indicates that the subtracting operations are performed by the triggering event signals 112.

The monitored signals can be scoped such that both the individual or grouped control-event and data signals that flow through the run-time links between the component objects are displayed. In addition, any internal signal, variable, and parameter, that is defined within a component object may be selectively displayed.

Figure 13:
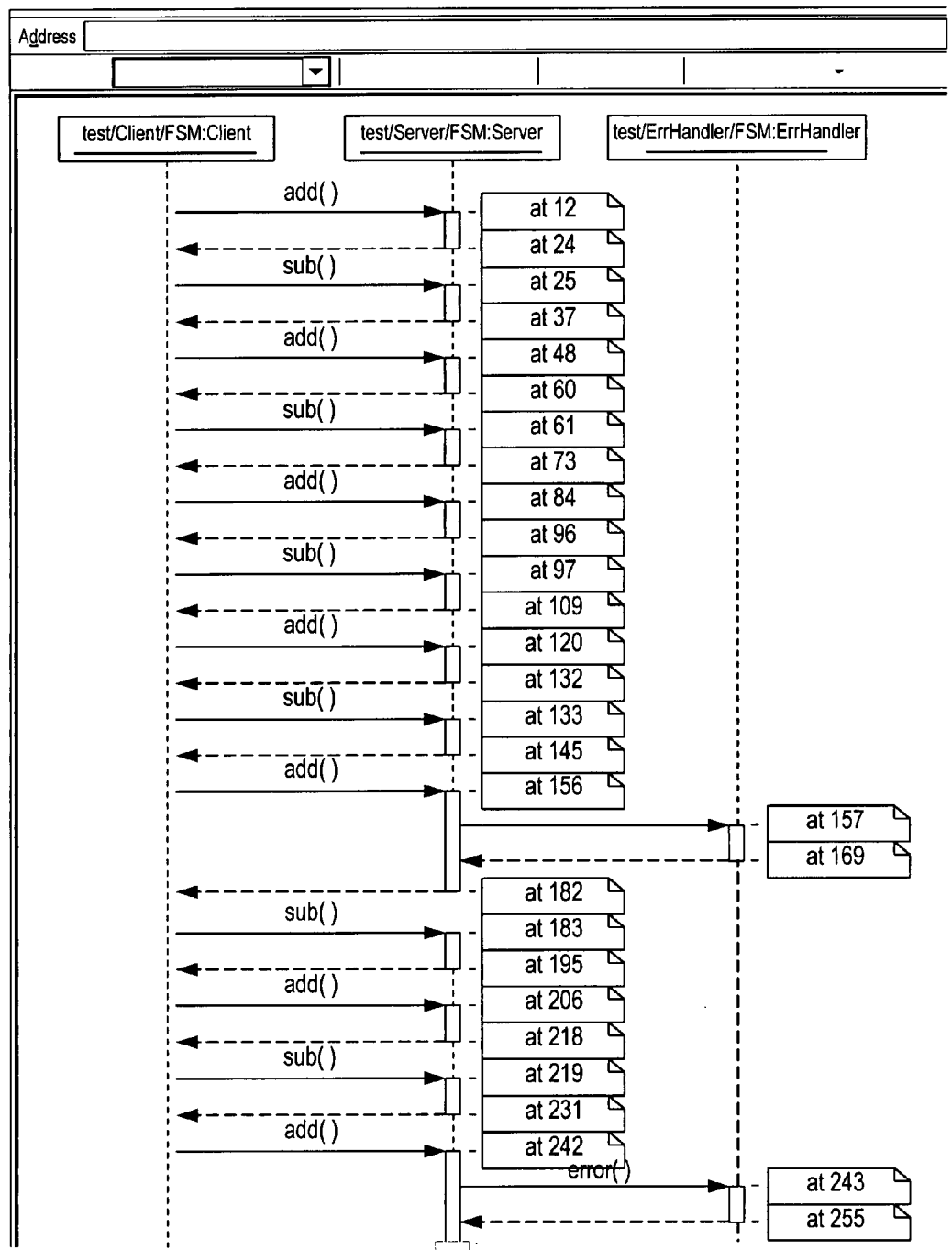
FIG. 13 is an exemplary sequence diagram generated using the simulation/execution data of the block diagram depicted in FIG. 11.

The illustrative embodiment may log calls and reply actions between the components of the model. The graphical programming or modeling environment 8 may construct a sequence diagram 130 based on the simulation and execution data of the model in the graphical programming or modeling environment, as depicted in FIG. 13. The sequence diagram 130 shows the processes that execute in sequence. The sequence diagram 130 shows the realized functions, which are called by the components of the model, that implement the behavior of the model, arranged in time. The sequence diagram 130 shows the flow of control across many objects in the model.

FIG. 13 shows the life-lines of the component objects and all interaction messages that are exchanged during the execution of the model in FIG. 12. It employs the basic UML notation at the abstraction level of the initial UML model such that it fosters the understanding between the software and system designers. In addition, it adds notations and tagged values on the interaction model to capture the temporal behavior of the realized components in the context that is set by the configuration of the simulation/execution. These annotations can be exploited to iteratively refine the assumptions and related requirements for using the components in a particular context.

The generated sequence diagram 130 may be merged into the source UML model 5 that contains the definition of the components of the model so that the user of the UML model 5 can have a real-time sequential behavior of the UML model 5 or the components of the UML model 5. The sequence diagram 130 may be exported into, for example, an XML format so that the UML environment 4 can recognize the sequence diagram 130 generated in the graphical programming or modeling environment 8.

Figure 14:
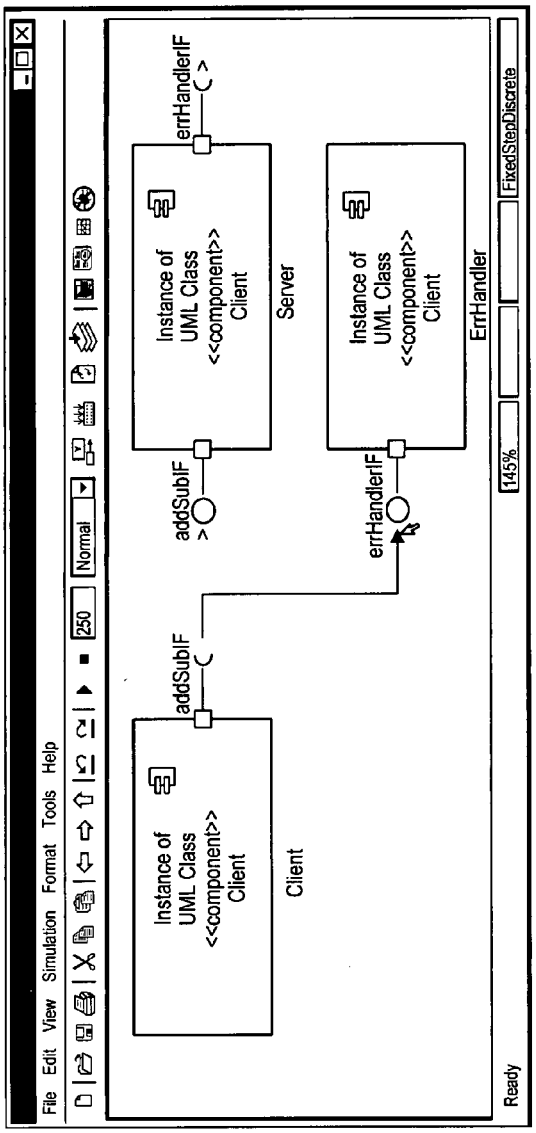
FIG. 14 is another exemplary block diagram that corresponds to a UML model.

FIG. 14 shows a block diagram that corresponds to a UML model. A connection is made between the Client and ErrHandler entities. Because of incompatible interfaces, this connection is invalid and this status is relayed to the user by coloring the line representing the connection. Alternate depictions of the invalidity of the connection are clear to the skilled practitioner in the art. In addition, specifics of the incompatibility of the connection may be displayed. For example, if an argument that is present in the client interface is absent in the server interface, this can be displayed to the user as a tooltip or by means of another user interface modality.

Figure 15:
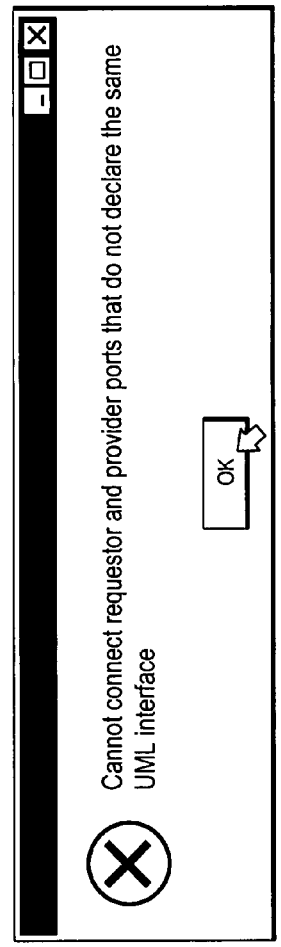
FIG. 15 is a dialog presented to the user when a connection between two incompatible components is made.

FIG. 15 shows a user dialog that may be presented to the user in response to the interface incompatibility of FIG. 14. This dialog can be extended by means to remedy the incompatibility. For example, a checklist may be included to solicit input from the user as to whether absent attributes should be included in either the Client or Server interface. These changes may be live reflected in the UML model from which the block diagram representation was derived.

With the realization of the components of the UML model 5, the graphical programming or modeling environment 8 may simulate or execute a deployment diagram of the UML 5. A deployment diagram is one of UML diagrams that serves to model the hardware used in system implementations and the associations between those components. The elements used in deployment diagrams are nodes, components and associations. Therefore, the simulation or execution of the deployment diagram assesses performance and schedulability requirement of run-time processing nodes against the time and numerical resolution of control and signal processing algorithms with safety and reliability constraints.

Since changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A non-transitory computer-readable medium storing instructions, the instructions comprising:
one or more instructions that, when executed by a computer, cause the computer to:
import, in a text-based format, a model that describes software or a system in a modeling language into a graphical modeling environment,
wherein the modeling language does not define a formal, executable semantic capable of describing a dynamic behavior of the software or system, and
wherein the model comprises model components;
generate executable elements, in the graphical modeling environment, that represent the model components,
wherein at least some of the executable elements comply with standards of a domain or a platform, and
wherein the domain or platform comprises CORBA, CORBA-RT, Advanced Architecture Description Language (AADL), AUTOSAR, Software Communication Architecture (SCA) as defined by the Department of Defense, or one or more derivatives of any one of the above;
generate an executable model in the graphical modeling environment,
the executable model comprising the executable elements and corresponding to the model that describes the software or system; and
update:
the model that describes the software or system based on changes made to the executable model, or
the executable model based on changes made to the model that describes the software or system.

2. The non-transitory computer-readable medium of claim 1, where the one or more instructions to generate the executable model comprise:
one or more instructions that, when executed by the computer, cause the computer to determine connectivity of the executable elements and link the executable elements.

3. The non-transitory computer-readable medium of claim 2, where the instructions further comprise:
one or more instructions that, when executed by the computer, cause the computer to generate code for the executable model in the graphical modeling environment,
wherein the one or more instructions to generate the code comprises one or more instructions to generate construction artifacts including one or more component description files for an AUTOSAR platform.

4. The non-transitory computer-readable medium of claim 1, where the executable model elements comprise hierarchical functional blocks.

5. The non-transitory computer-readable medium of claim 1, wherein the modeling language comprises unitary modeling language (UML), or a specialized dialect of UML with optional extensions.

6. The non-transitory computer-readable medium of claim 5, wherein the specialized dialect of UML with optional extensions comprises SysML or a variant of UML with system-engineering extensions, or the Advanced Architecture Description Language (AADL).

7. The non-transitory computer-readable medium of claim 1, wherein the one or more instructions to update the model that describes the software or system or the executable model comprise one or more instructions to synchronize updating the model that describes the software or system and the executable model.

8. A method comprising:
importing, by one or more processors, in a text-based format, a model that describes software or a system in a modeling language into a graphical modeling environment,
wherein the modeling language does not define a formal, executable semantic capable of describing a dynamic behavior of the software or system, and
wherein the model comprises model components;
generating, by the one or more processors, executable elements, in the graphical modeling environment, that represent the model components,
wherein at least some of the executable elements comply with standards of a domain or a platform, and
wherein the domain or platform comprises CORBA, CORBA-RT, Advanced Architecture Description Language (AADL), AUTOSAR, Software Communication Architecture (SCA) as defined by the Department of Defense, or one or more derivatives of any one of the above;
generating, by the one or more processors, an executable model in the graphical modeling environment,
the executable model comprising the executable elements and corresponding to the model that describes the software or system; and
updating, by the one or more processors, the model that describes the software or system, based on changes made to the executable model; or
updating, by the one or more processors, the executable model, based on changes made to the model that describes the software or system.

9. The method of claim 8, wherein the modeling language comprises unitary modeling language (UML), or a specialized dialect of UML with optional extensions.

10. The method of claim 9, wherein the specialized dialect of UML with optional extensions comprises SysML or a variant of UML with system-engineering extensions, or the Advanced Architecture Description Language (AADL).

11. The method of claim 8, wherein updating the model that describes the software or system or updating the executable model comprises synchronizing updating the model that describes the software or system and the executable model.

12. The method of claim 8, further comprising generating code for the executable model in the graphical modeling environment,
wherein the generated code comprises generating construction artifacts including one or more component description files for an AUTOSAR platform.

13. The method of claim 8, wherein the executable model elements comprise hierarchical functional blocks.

14. The method of claim 8, wherein generating the executable model comprises determining connectivity of the executable elements and linking the executable elements.

15. A system comprising:
one or more processors to:
import, in a text-based format, a model that describes software or a system in a modeling language into a graphical modeling environment, wherein the modeling language does not define a formal, executable semantic capable of describing a dynamic behavior of the software or system, and wherein the model comprises model components;

generate executable elements, in the graphical modeling environment, that represent the model components, wherein at least some of the executable elements comply with standards of a domain or a platform, and wherein the domain or platform comprises CORBA, CORBA-RT, Advanced Architecture Description Language (AADL), AUTOSAR, Software Communication Architecture (SCA) as defined by the Department of Defense, or one or more derivatives of any one of the above;

generate an executable model in the graphical modeling environment, the executable model comprising executable elements and corresponding to the model that describes the software or system; and update:

the model that describes the software or system based on changes made to the executable model, or the executable model based on changes made to the model that describes the software or system.

16. The system of claim 15, wherein the modeling language comprises unitary modeling language (UML), or a specialized dialect of UML with optional extensions.

17. The system of claim 16, wherein the specialized dialect of UML with optional extensions comprises SysML or a variant of UML with system-engineering extensions, or the Advanced Architecture Description Language (AADL).

18. The system of claim 15, wherein, when updating the model that describes the software or system or the executable model, the one or more processors are to synchronize updating the model that describes the software or system and the executable model.

19. The system of claim 15, wherein the one or more processors are further to generate code for the executable model in the graphical modeling environment, wherein, when generating the code, the one or more processors are to generate construction artifacts including one or more component description files for an AUTOSAR platform.

20. The system of claim 15, wherein the executable model elements comprise hierarchical functional blocks.

21. The system of claim 15, wherein, when generating the executable model, the one or more processors are to determine connectivity of the executable elements and linking the executable elements.

* * * * *

UNITED STATES PATENT AND TRADEMARK OFFICE
CERTIFICATE OF CORRECTION

| | | |
|---|---|---|
| PATENT NO. | : 9,311,057 B2 | Page 1 of 1 |
| APPLICATION NO. | : 11/891467 | |
| DATED | : April 12, 2016 | |
| INVENTOR(S) | : Brunel et al. | |

It is certified that error appears in the above-identified patent and that said Letters Patent is hereby corrected as shown below:

In the claims

Claim 15

Column 27, line 18, change "model comprising executable" to --model comprising the executable--

Signed and Sealed this
Twenty-eighth Day of June, 2016

Michelle K. Lee
*Director of the United States Patent and Trademark Office*